US008381692B2

(12) United States Patent
Islas

(10) Patent No.: US 8,381,692 B2
(45) Date of Patent: Feb. 26, 2013

(54) INTERNAL COMBUSTION ENGINE WITH EXHAUST-PHASE POWER EXTRACTION SERVING CYLINDER PAIR(S)

(76) Inventor: John J. Islas, Baldwinsville, NY (US)

( * ) Notice: Subject to any disclaimer, the term of this patent is extended or adjusted under 35 U.S.C. 154(b) by 141 days.

(21) Appl. No.: 13/013,944

(22) Filed: Jan. 26, 2011

(65) Prior Publication Data

US 2012/0085301 A1 Apr. 12, 2012

Related U.S. Application Data

(60) Provisional application No. 61/299,362, filed on Jan. 29, 2010.

(51) Int. Cl.
*F02B 41/00* (2006.01)
*F02B 41/06* (2006.01)
*F16H 21/18* (2006.01)

(52) U.S. Cl. ............... 123/53.2; 74/44; 60/598; 60/620; 123/52.1; 123/52.4; 123/197.1

(58) Field of Classification Search .................... 60/320, 60/514, 619, 598; 74/603, 44; 123/58.3, 123/59.6, 68, 71 R, 78 D, 193.1, 197.4, 52.1, 123/52.3

See application file for complete search history.

(56) References Cited

U.S. PATENT DOCUMENTS 1,076,846 A * 10/1913 Blick .......................... 123/71 R
1,172,976 A * 2/1916 Frederickson ............. 123/188.4
1,250,950 A * 12/1917 Bolton ......................... 123/59.7
1,585,796 A * 5/1926 Stahlberger ........................ 74/44
1,701,439 A * 2/1929 Canfield ........................... 74/44
2,392,921 A * 1/1946 Holman ............................ 74/40
3,608,307 A * 9/1971 Strom .............................. 60/598
4,159,699 A * 7/1979 McCrum ...................... 123/58.8
4,898,041 A * 2/1990 Islas .................................. 74/44
5,072,589 A * 12/1991 Schmitz ........................... 60/622
6,189,493 B1 * 2/2001 Gray, Jr. ....................... 123/52.4
7,201,156 B1 * 4/2007 Wait .............................. 123/556

FOREIGN PATENT DOCUMENTS

WO WO 81/02039 * 7/1981

* cited by examiner

*Primary Examiner* — Rinaldi Rada
*Assistant Examiner* — Kevin Lathers
(74) *Attorney, Agent, or Firm* — Bernard P. Molldrem, Jr.

(57) ABSTRACT

A heat engine employs an auxiliary cylinder to receiving exhaust gases from a main cylinder during its exhaust phase to extract mechanical energy from the heat in the exhaust gases. The auxiliary cylinder has an auxiliary piston that reciprocates with an asymmetric pattern in respect to the main crank a counter-rotating auxiliary cranks such that the downward stroke of the auxiliary piston and the upward stroke of the auxiliary piston correspond to crank angles above and below 180 degrees. In one favorable embodiment, fresh air can be drawn in and combined with the exhaust gases.

12 Claims, 30 Drawing Sheets

15 DEGREE ROTATION (1*)

15 DEGREE ROTATION (3*)

15 DEGREE ROTATION (4*)

15 DEGREE ROTATION (5*)

15 DEGREE ROTATION (7*)

15 DEGREE ROTATION (10*)

15 DEGREE ROTATION (11*)

15 DEGREE ROTATION (12*)

15 DEGREE ROTATION (13*)

15 DEGREE ROTATION (14*)

15 DEGREE ROTATION (15*)

15 DEGREE ROTATION (20*)

15 DEGREE ROTATION (21*)

15 DEGREE ROTATION (22*)

15 DEGREE ROTATION (23*)

INTERNAL COMBUSTION ENGINE WITH EXHAUST-PHASE POWER EXTRACTION SERVING CYLINDER PAIR(S)

Applicant claims priority under 35 U.S.C. §119(e) of Provisional Application Ser. No. 61/299,362, filed Jan. 29, 2010.

BACKGROUND OF THE INVENTION

This invention is directed to internal combustion engines of the reciprocating type, and is more particularly concerned with reciprocating engines combined with an auxiliary cylinder and piston that is driven by the engine exhaust gases. The invention is directed to the extraction of waste energy in the exhaust gases to increase engine power and efficiency, and to reduce cranking losses.

In any reciprocating heat engine, only a small fraction of the input heat energy is converted into rotational energy. In an internal combustion piston-type engine, whether diesel or gasoline, and whether four-stroke or two-stroke cycle, a large fraction of the energy of the hot combustion gases is discharged in the exhaust gases, and leaves the engine without doing any useful work.

In a typical four-stroke gasoline engine, for example, the piston reciprocates twice and the crank rotates twice for a given cycle of intake-compression-power-exhaust phases for each cylinder. In most multiple cylinder engines, the pistons are paired with two pistons reciprocating up and down together, but at opposite strokes in the cycle. That is, in the example of a two-cylinder in-line engine, piston 1 (in cylinder 1) will be in its intake stroke while piston 2 (in cylinder 2) is in its power stroke. Likewise, piston 1 will be in its compression, power and exhaust strokes when piston 2 is in its exhaust, intake and compression strokes, respectively. The pair of cylinders and pistons has one exhaust phase between them for each crank rotation, i.e., for each time the pair of pistons rises from bottom dead center (BDC) to top dead center (TDC). This means that there is hot exhaust gas leaving the pair of cylinders during each rotation. This gas simply travels through an exhaust manifold, to a pollution control device such as a catalytic converter, then to an exhaust pipe. Exhaust gases go directly from a high pressure to atmospheric pressure, so a muffler has to be placed in line in the exhaust pipe to reduce the engine noise. The muffler itself creates a back pressure that reduces engine efficiency.

In my prior U.S. Pat. No. 4,898,041, Drive Linkage for Reciprocating Engine, which is incorporated by reference herein, I introduced the concept of a twin-shaft, counter-rotating crank construction, which allowed the piston to have more dwell on compression and exhaust than on power and intake, and so the compression forces could be spread out over a crank angle exceeding 180 degrees (e.g., 230°). The power and intake would then take place over a crank angle reduced below 180° (e.g., 130°). This allows more of the combustion energy to be used in turning the crank, and reduces the amount of mechanical torque needed for compressing the fuel-air mixture on the compression stroke. In that arrangement, the combustion and power-exhaust-intake-compression phases take place within the cylinders of the device.

I have now found that this same construction as disclosed in my U.S. Pat. No. 4,898,041 can be employed in a supplemental or secondary cylinder for extracting energy from the hot gases that escape the engine cylinders as exhaust from a pair of cylinders of an internal combustion engine. The secondary cylinder can be coupled to the main engine crank to assist in compression and in turning the main engine crank. The secondary or auxiliary piston and cylinder operate in the fashion of U.S. Pat. No. 4,898,041, where the main internal combustion engine cylinders, pistons, and cranks may employ a standard reciprocating rotary design.

OBJECTS AND SUMMARY OF THE INVENTION

It is an object to employ an auxiliary cylinder and piston to extract heat energy from the exhaust of a cylinder or pair of cylinders of an internal combustion engine, and thereby increase the engine performance parameters, i.e., increased power and efficiency.

It is another object to provide an internal combustion engine with an auxiliary cylinder and piston having an asymmetric phase characteristic, e.g, with a greater crank angle on the down stroke and a smaller crank angle on the up stroke, to optimize the power extraction from the main cylinder exhaust gases.

According to an aspect of this invention, an internal combustion engine has at least one main piston that reciprocates up and down within a main engine cylinder and is coupled to a main rotating crank. The main piston has at least a compression phase and an exhaust phase, and would typically also have an intake phase and a compression stage, in the case of a "four-stroke" design. In a "two-stroke" design, the intake and exhaust occur near BDC in each rotation, and the compression and power phases occur on the upstroke and downstroke. Regardless of the design of the internal combustion engine, there is an associated auxiliary cylinder which has an intake receiving exhaust gases from the at least one main piston during its exhaust phase. An auxiliary exhaust valve opens during the cycle of the main piston, e.g., when one of the main cylinders (or the one main cylinder) is in its compression phase. An auxiliary piston travels in the auxiliary cylinder and is adapted to reciprocate within the auxiliary cylinder. An auxiliary crank is coupled to the main crank to counter-rotate continuously with the main rotating crank, at the same speed but in the opposite direction. There are connecting rods and arms that couple the auxiliary piston with the main and auxiliary cranks such that the upward (or downward) stroke of the auxiliary piston corresponds to a crank angle exceeding 180 degrees for the main rotary cranks, and the complementary downward (or upward) stroke of the auxiliary piston corresponds to a crank angle below 180 degrees for the main rotary cranks. Favorably, the down stroke and up stroke may correspond to about 230 degrees and 130 degrees, respectively, of the main cranks.

Favorably main engine has two main cylinders, or a number of pairs of cylinders, and for each pair there are two main pistons that are paired to reciprocate together. For each pair of main pistons and main cylinders, there is one auxiliary cylinder and one auxiliary piston coupled with said pair of main cylinders. Each of the pair of main cylinders has an exhaust conduit leading to the associated auxiliary cylinder. An exhaust valve in each cylinder then opens the associated main cylinder to the respective exhaust conduit during an exhaust phase thereof. The auxiliary cylinder has an exhaust port in a side wall thereof which is open for a predetermined dwell near bottom dead center of said auxiliary piston. This exhaust port opens and closes in the fashion of the exhaust port of a two-stroke engine to discharge from the auxiliary cylinder when the auxiliary piston passes below it near BDC. A reed valve or other valve admits fresh air into auxiliary cylinder at a given phase of the auxiliary piston. This dilutes the expanded exhaust gases, and in some cases may render the muffler and/or catalytic converter unnecessary.

These and other objects, features, and advantages of this invention will become apparent from the ensuing description of preferred embodiment(s), which is to be read in connection with the accompanying Drawing.

DETAILED DESCRIPTION OF THE PREFERRED EMBODIMENT(S)

The figures of Drawing illustrate the improved internal combustion engine of my invention.

Figure 1:
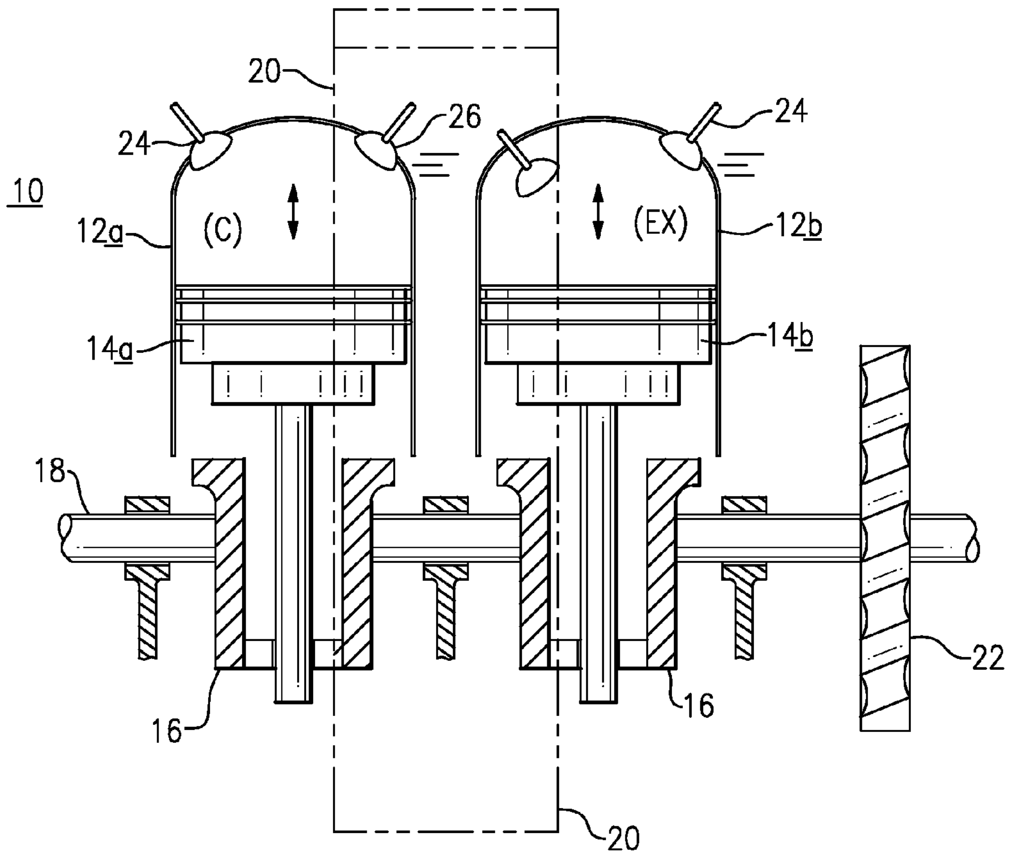
FIG. 1 is a schematic view of a twin-cylinder in-line internal combustion engine, according to an embodiment of the invention.

FIG. 1 is a schematic view of a twin-cylinder in-line internal combustion engine 10, with the position of the supplemental or auxiliary cylinder 20 shown in broken line. Here the engine has first and second main cylinders 12*a* and 12*b*, each with a respective first piston 14*a* and 14*b*, which reciprocate within the cylinders and drive cranks 16, which in turn rotates a main crank shaft 18. A drive gear 22 for the auxiliary power extraction feature is positioned on the crank shaft. The gear 22 meshes with a similar gear (shown in later views) to turn the supplemental or auxiliary crank for the auxiliary cylinder's piston. Also shown here are intake valves 24 and exhaust valves 26 for admitting and discharging the gases that work the main pistons 14*a*, 14*b*, and which operate in a known fashion, here as a standard four-cycle system. Not shown here are valve timing mechanisms, ignition systems, or heat management systems, which would be well understood by persons familiar with internal combustion engines.

Figure 2:
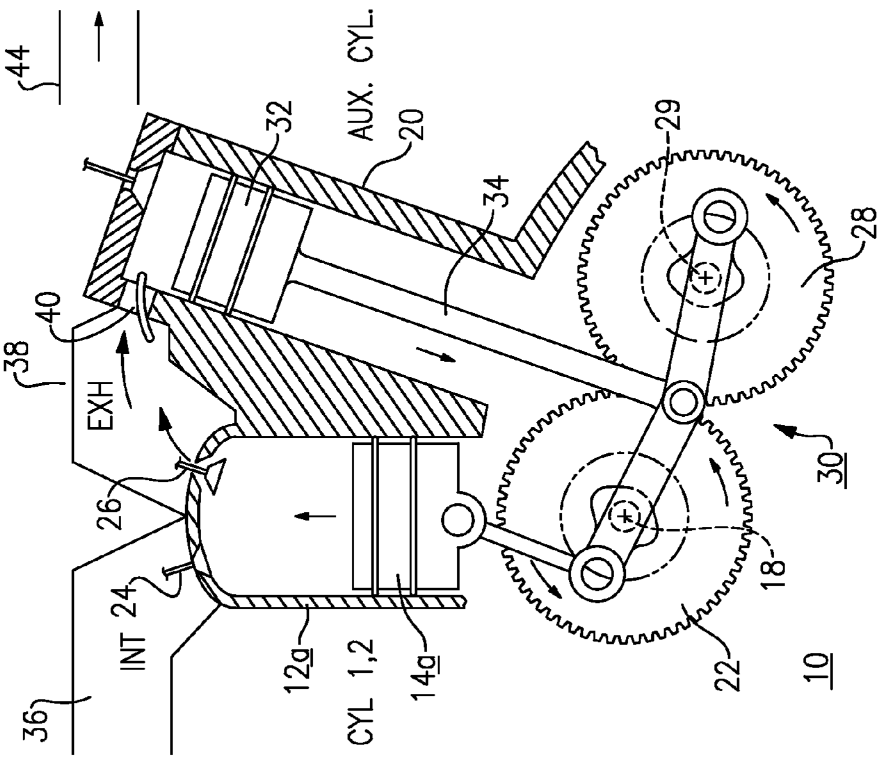
FIG. 2 is a section view thereof taken along the crank axis.

FIG. 2 is a section view along the crank axis, with the first one of the main four-stroke engine pistons 14*a* rising from BDC in an exhaust stroke. The companion piston 14*b* (obscured behind) would be rising from BDC also, in a compression stroke. As illustrated here, the auxiliary drive gear 22 and its companion counter-rotating gear 28 and an associated crank shaft 29 operate a reciprocating drive 30 (as described and explained in my earlier U.S. Pat. No. 4,898,041, which connects to an auxiliary piston 32 by means of an auxiliary piston rod 34, so that the auxiliary piston 32 reciprocates in an asymmetric fashion within the auxiliary cylinder 20. This view also shows, schematically, an intake manifold 36 leading to the intake valve 24 and an exhaust duct 38 into which exhaust gases are discharged from the exhaust valve 26. Here, the exhaust duct 38 leads to a reed valve 40 that opens under positive pressure into a chamber above the auxiliary piston 32 The first piston 14*a*, shown here, pushes the exhaust gases out the combustion chamber, through the exhaust valve 26 and an exhaust duct 38, and then through the reed valve 40 into the auxiliary cylinder 20 above the piston 32. The hot exhaust gases received here urge the auxiliary piston 32 downward, turning the twin cranks shafts 18, 29.

Figure 3:
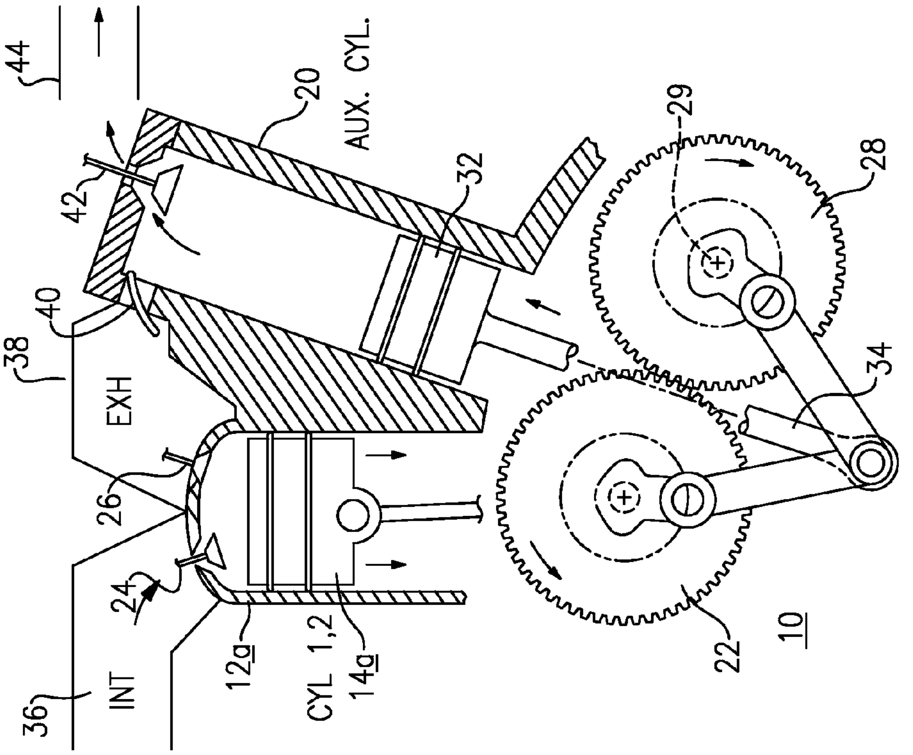
FIG. 3 is a similar view shown in another phase.

FIG. 3 is similar to FIG. 2, but shows the engine 10 in a subsequent stroke, in which the first main piston 14*a* is in its intake phase (the second or companion main piston 14*b*—not visible here—is in its power phase). The exhaust valve 26 here is closed. The reed valve 40 to the auxiliary cylinder is also closed from back pressure within the auxiliary cylinder 20, as the auxiliary piston 32 is in its upward motion from BDC toward TDC. The auxiliary piston pushes the expanded and cooled exhaust gases out through an auxiliary cylinder exhaust valve 42 and into an exhaust manifold 44.

In the next rotation, the roles of the two main pistons 14*a*, 14*b* will be reversed, so the second cylinder 12*b* will be in its exhaust phase when the pistons rise from BDC, and the exhaust gas is fed from the second cylinder 12*b* into the auxiliary cylinder. Thus, the exhaust gas from the main internal combustion engine cylinders feeds the auxiliary cylinder on every crank rotation, and the expanded gas will be driven out of the auxiliary cylinder 20 on each crank rotation.

Here, the downward phase of the auxiliary piston 32 is given the larger fraction of crank rotation, e.g., 230°, which gives the auxiliary piston 32 a larger dwell and a greater mechanical advantage during the time that one or the other of the main cylinders 12*a*, 12*b* is in its compression phase, and when there is a high reverse torque imposed by the fuel-air charge being compressed. The smaller crank rotation (e.g., 130°) occurs on the upstroke of the auxiliary piston 32, when the exhaust valve 42 is open and there is a very low gas back pressure within the auxiliary cylinder 20.

Figure 4:
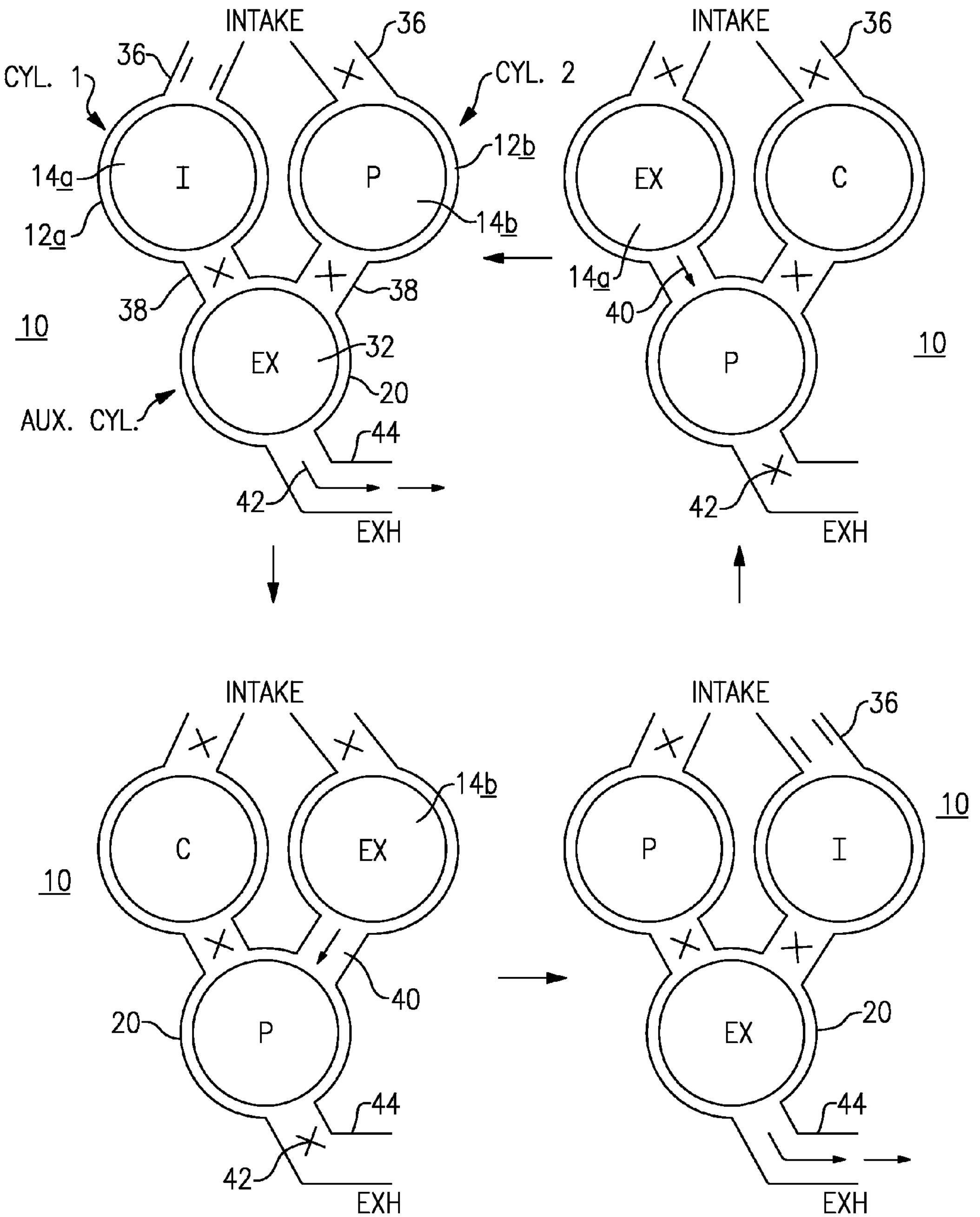
FIG. 4 is a schematic diagram that illustrates the relative phases of the main internal combustion cylinders and the auxiliary cylinder through the four stroke phases of intake I, compression C, power P and exhaust Ex.

FIG. 4 illustrates the relative phases of the main internal combustion cylinders 12*a* and 12*b* and the auxiliary cylinder 20 through the four stroke phases of intake I, compression C, power P and exhaust Ex, and the corresponding stroke phases of power P and exhaust Ex of the auxiliary cylinder 20. Here, the cylinders 12*a*, 12*b*, 20 and pistons 14*a*, 14*b*, 32 are schematically shown from above. The positions of the exhaust valves 26 and 42, reed valve 40, exhaust ducts 38 and 44 are shown to illustrate the flow of the working gas from cylinder to cylinder.

The simple illustration here employs two main cylinders, but in any practical engine, there can be a single main cylinder, or there may be four, six, or eight cylinders, with an appropriate distribution of associated auxiliary cylinders and pistons among the pairs of cylinders of such internal combustion engine. The example here illustrates the auxiliary cylinder design with a four-stroke gasoline engine. However, with appropriate design changes, an auxiliary cylinder that operates on the same general principle can be incorporated into a two-stroke engine of any number of cylinders.

Figure 5:
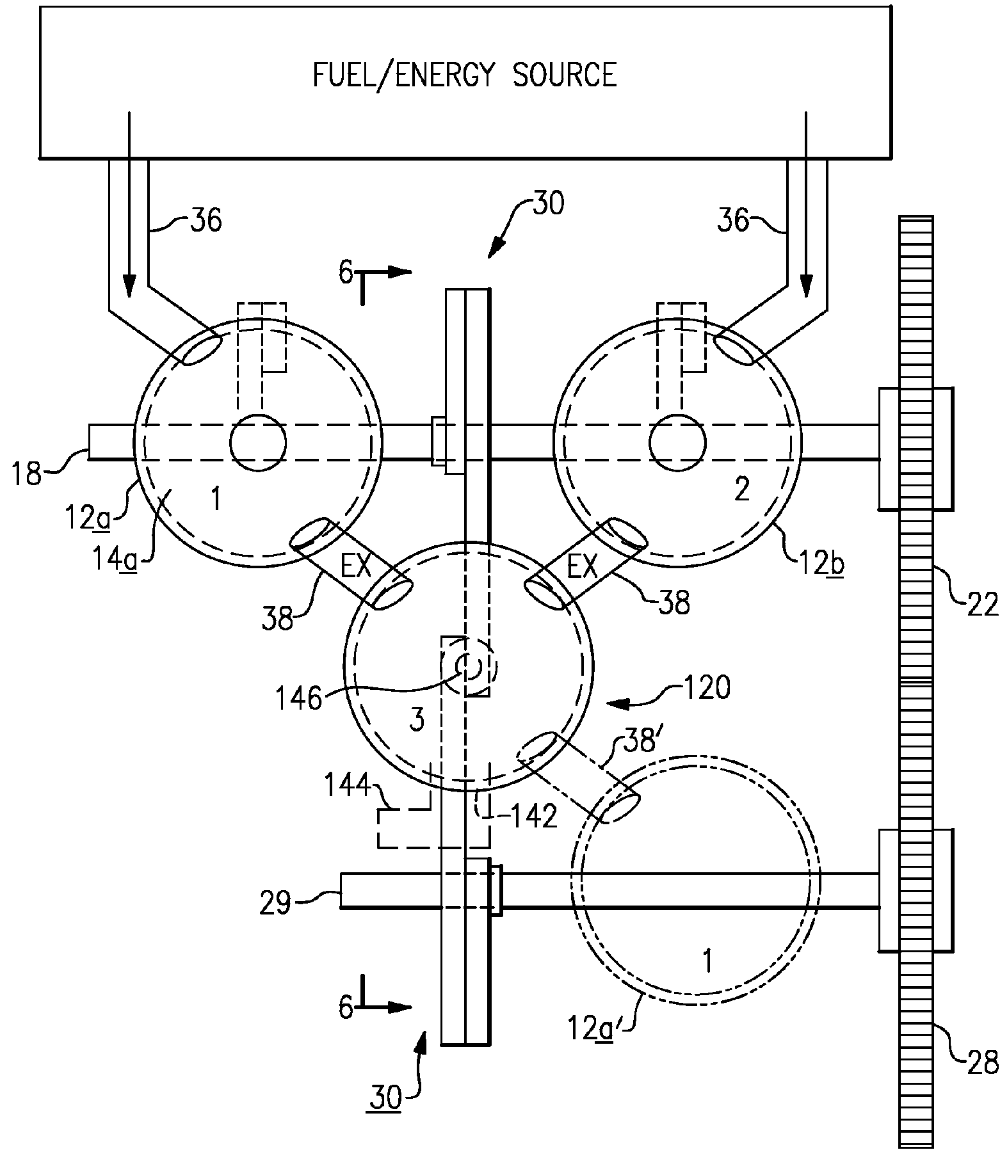
FIG. 5 is a top plan schematic view of another exemplary embodiment.
Figure 6:
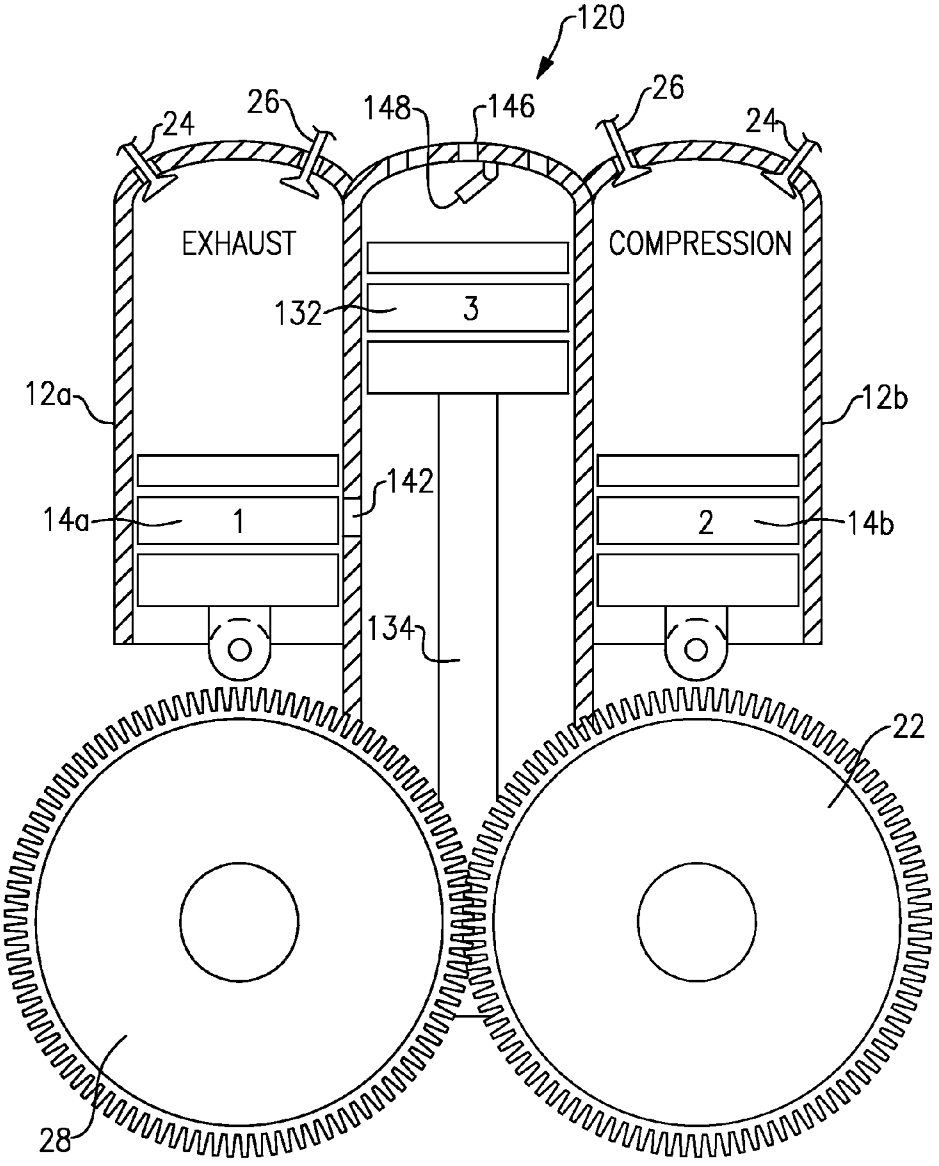
FIG. 6 is an elevational sectional view thereof, taken at line 6-6 of FIG. 5.
Figure 7:
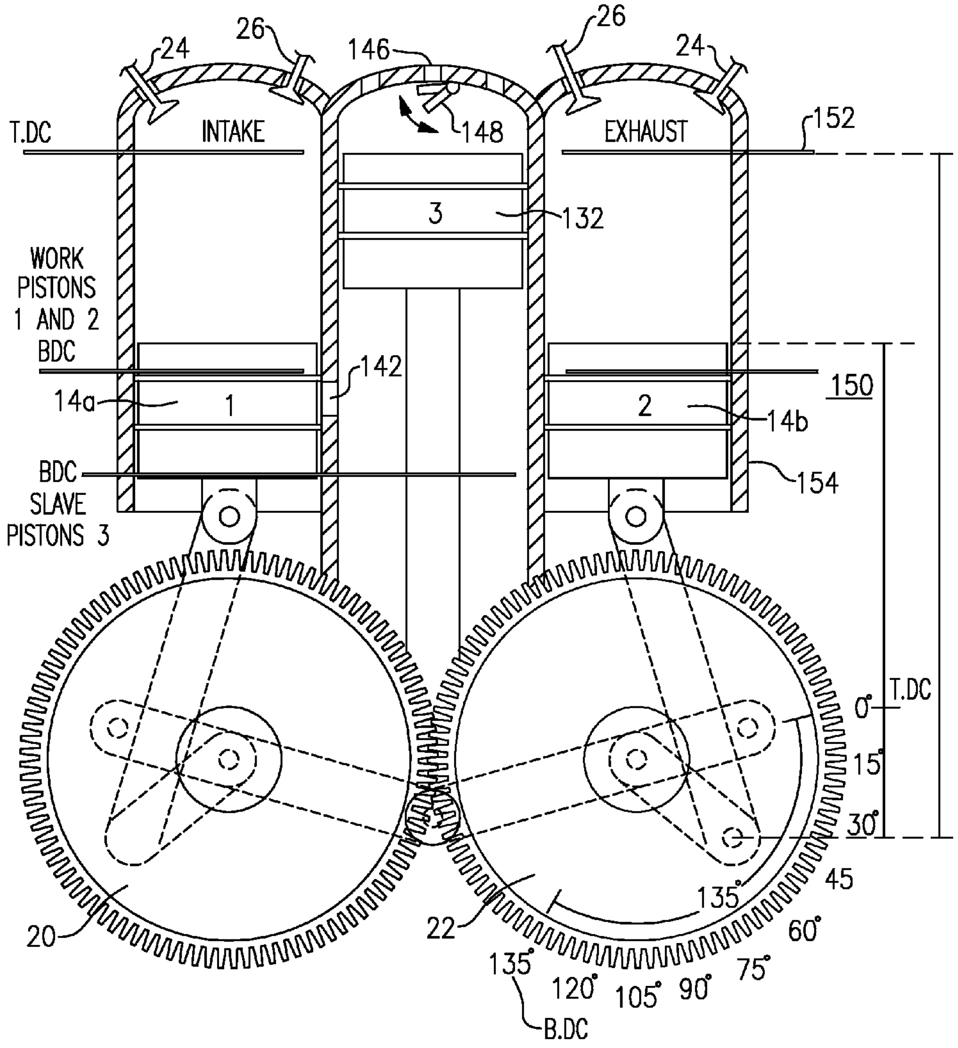
FIG. 7 is another elevational sectional view thereof.
Figure 8A:
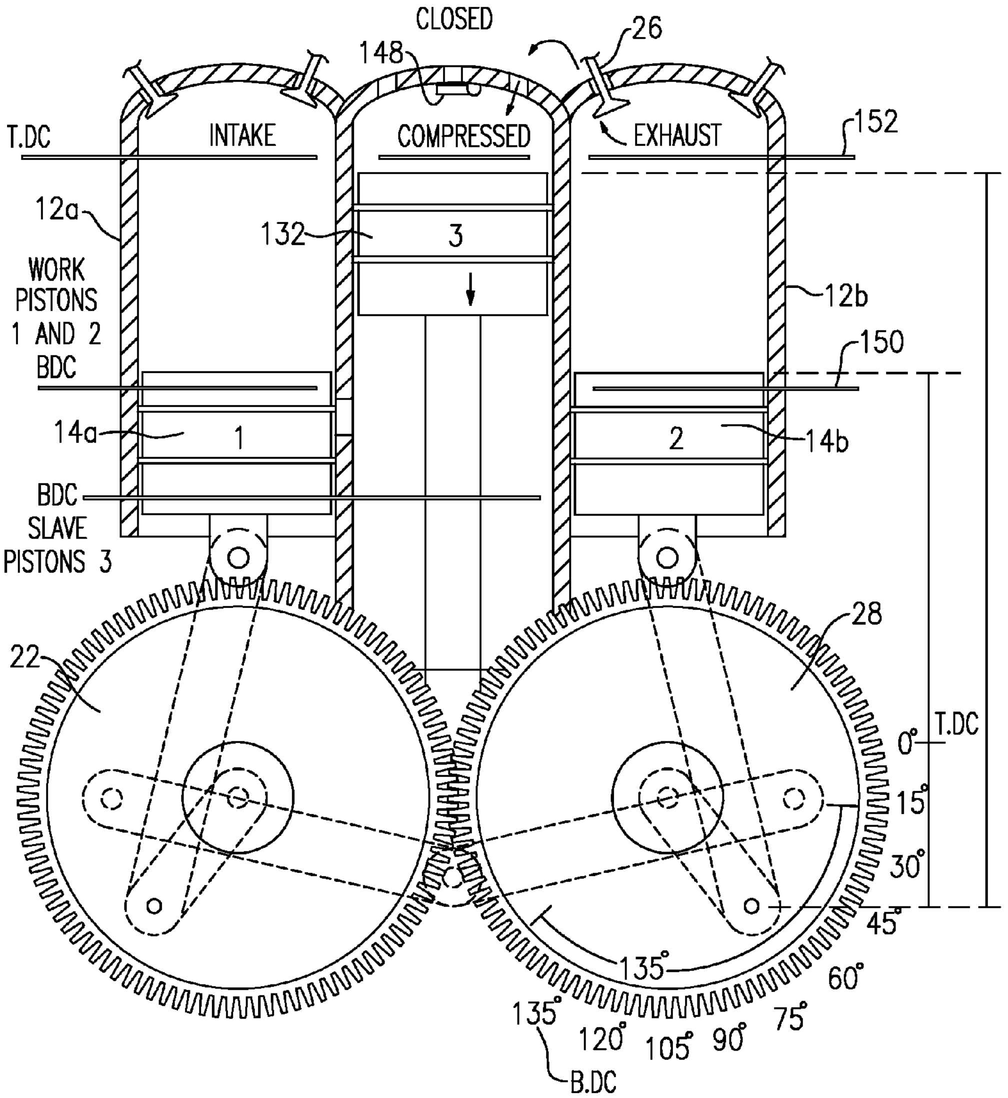
FIGS. 8A to 8X are elevational views taken at successive fifteen-degree increments of crank rotation, for explaining the operation of this embodiment, and showing the relative motion of the main and auxiliary pistons.
Figure 8B:
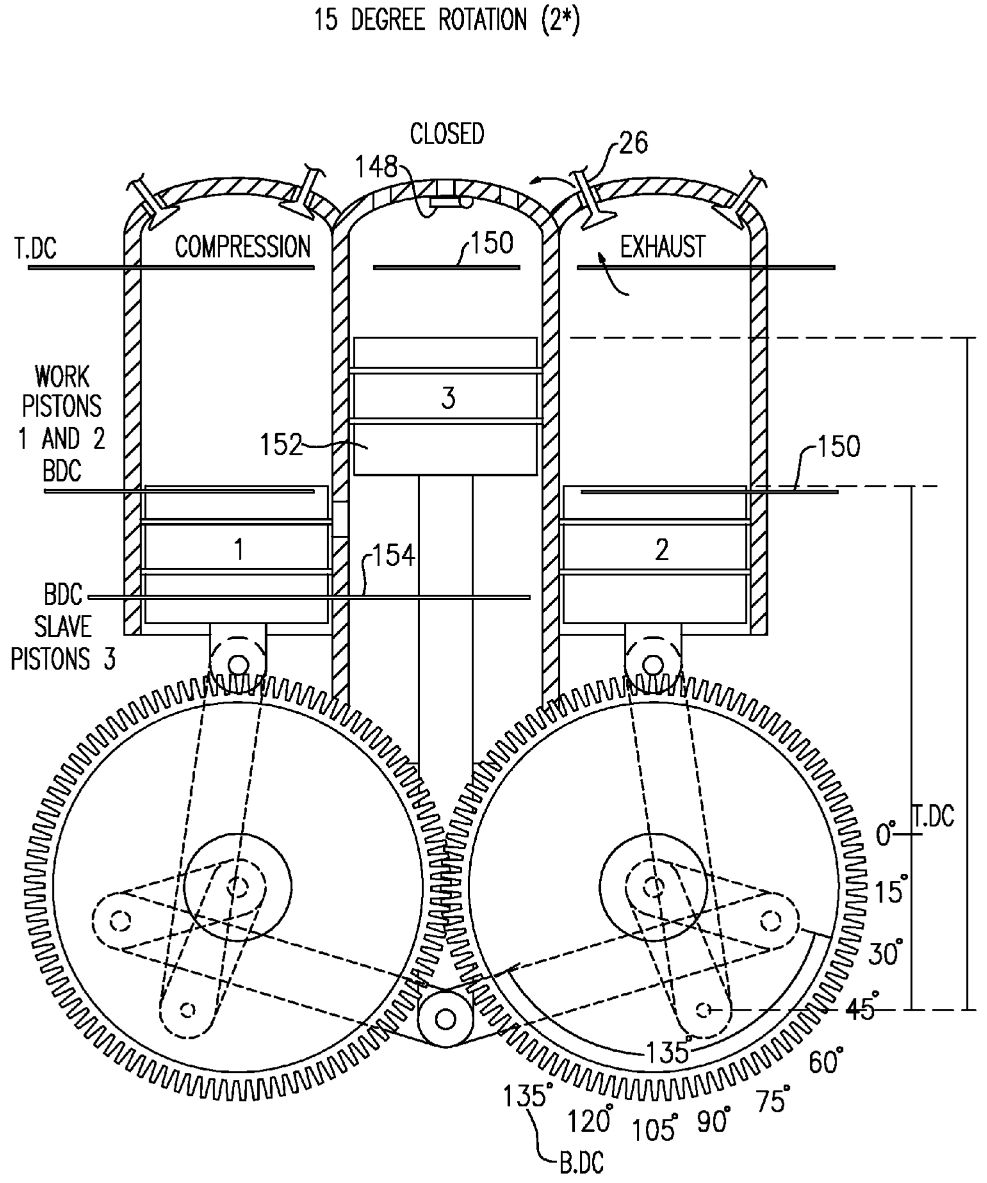
Figure 8C:
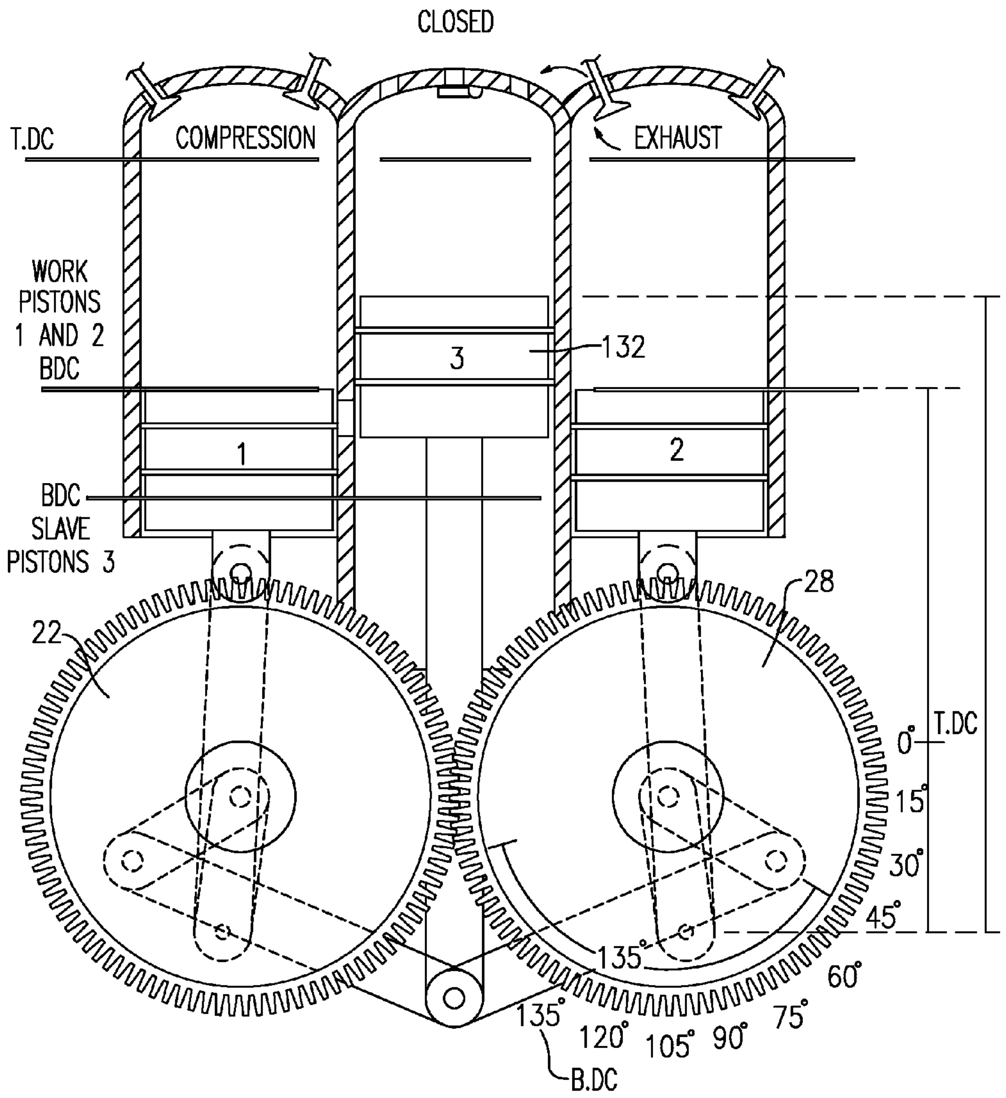
Figure 8D:
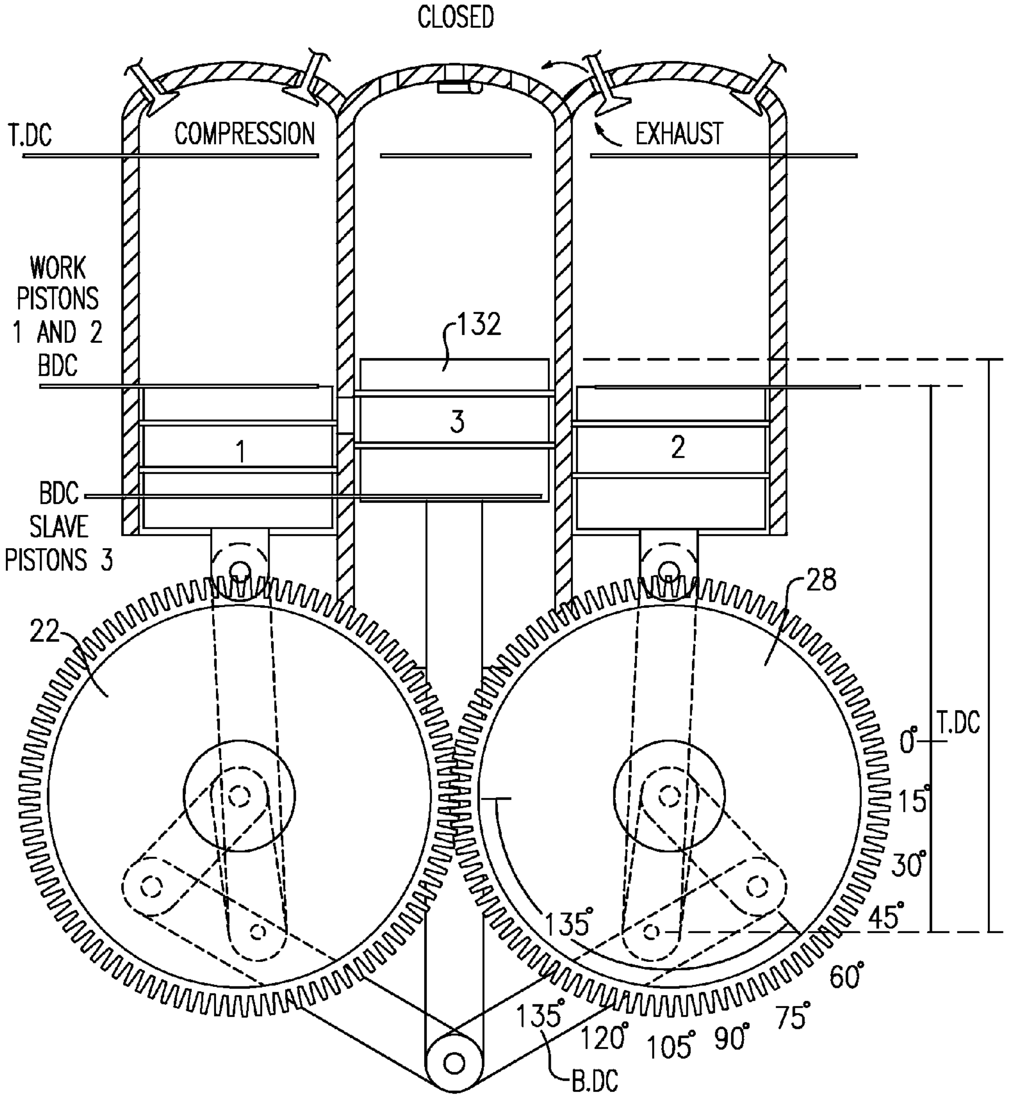
Figure 8E:
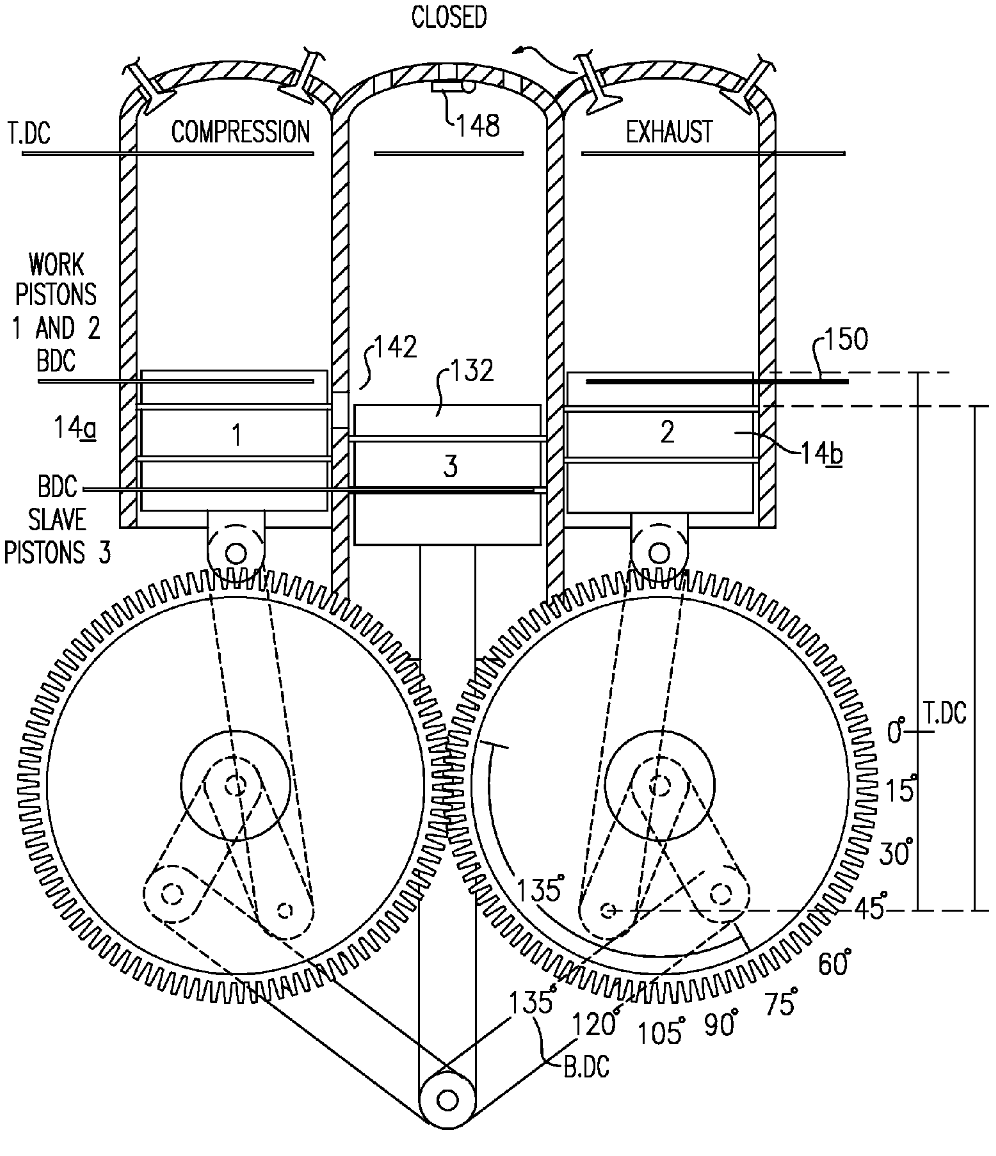
Figure 8F:
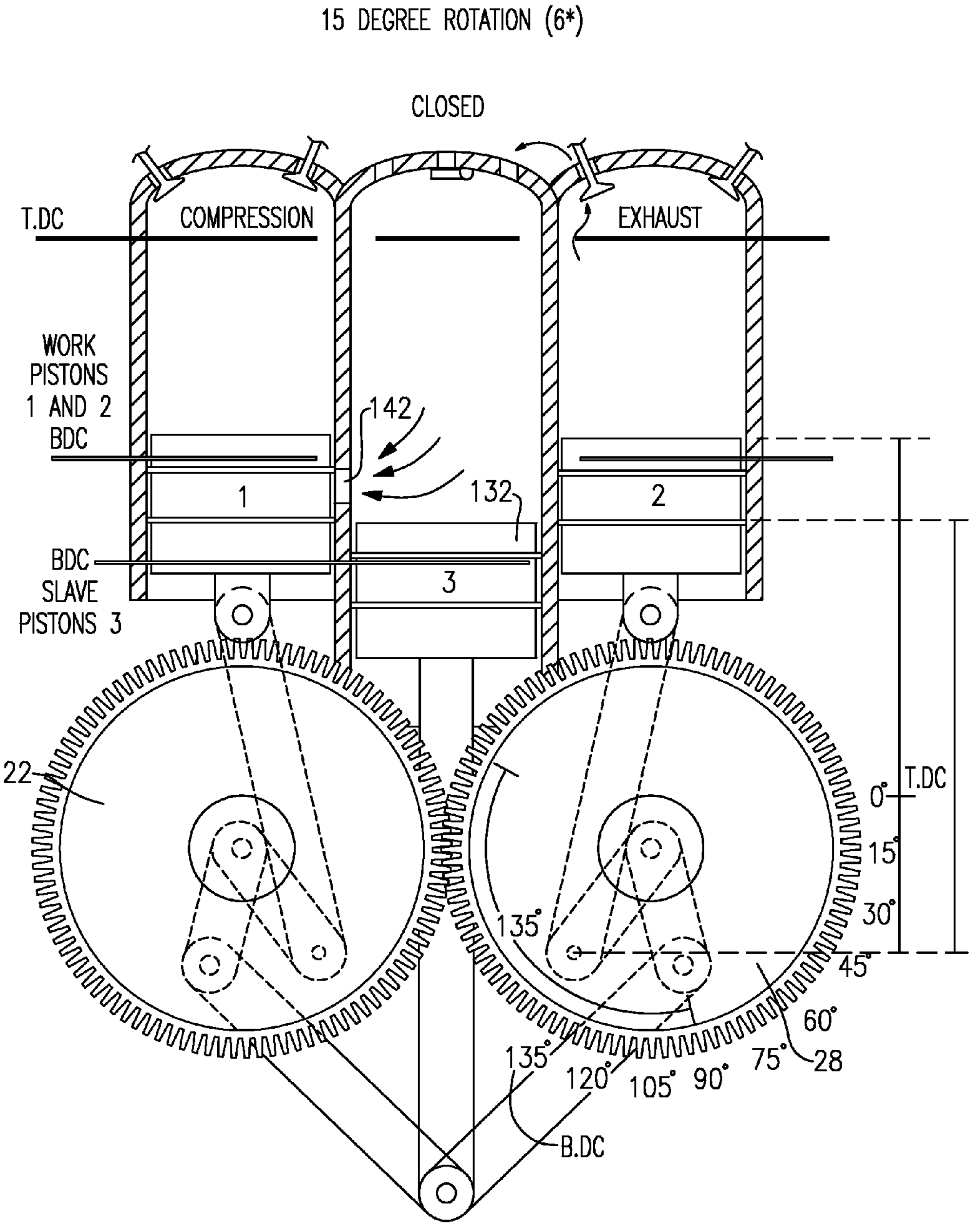
Figure 8G:
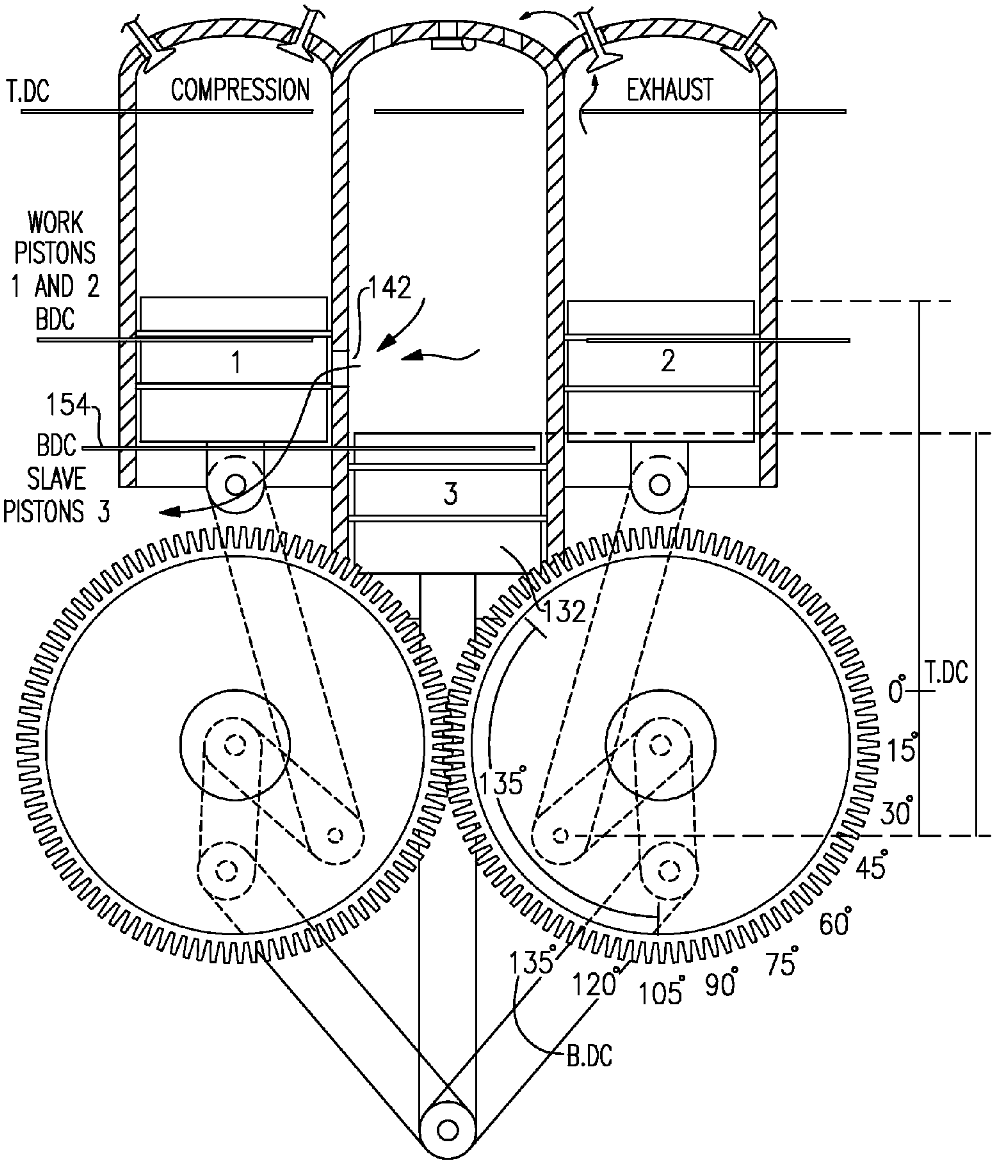
Figure 8H:
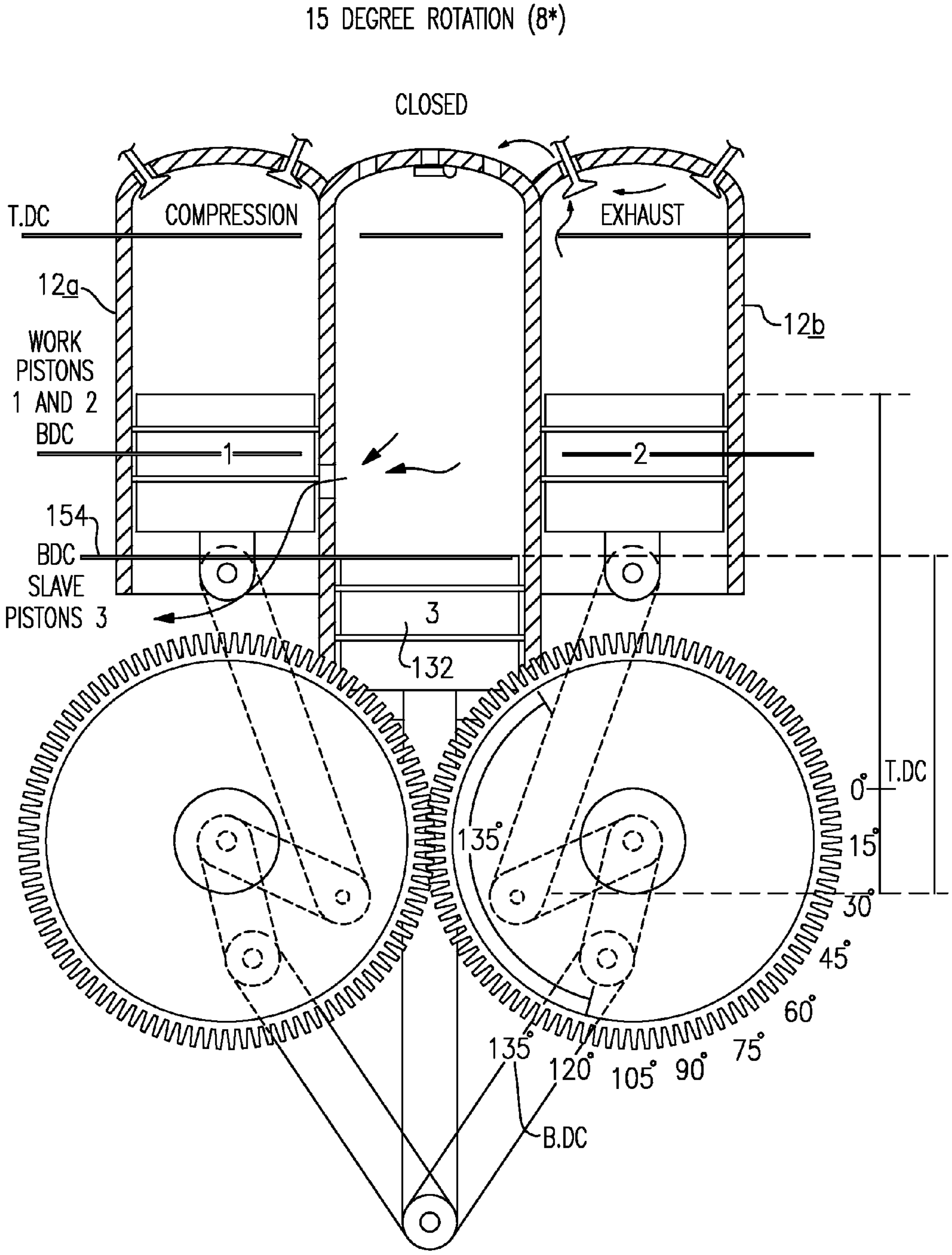
Figure 8I:
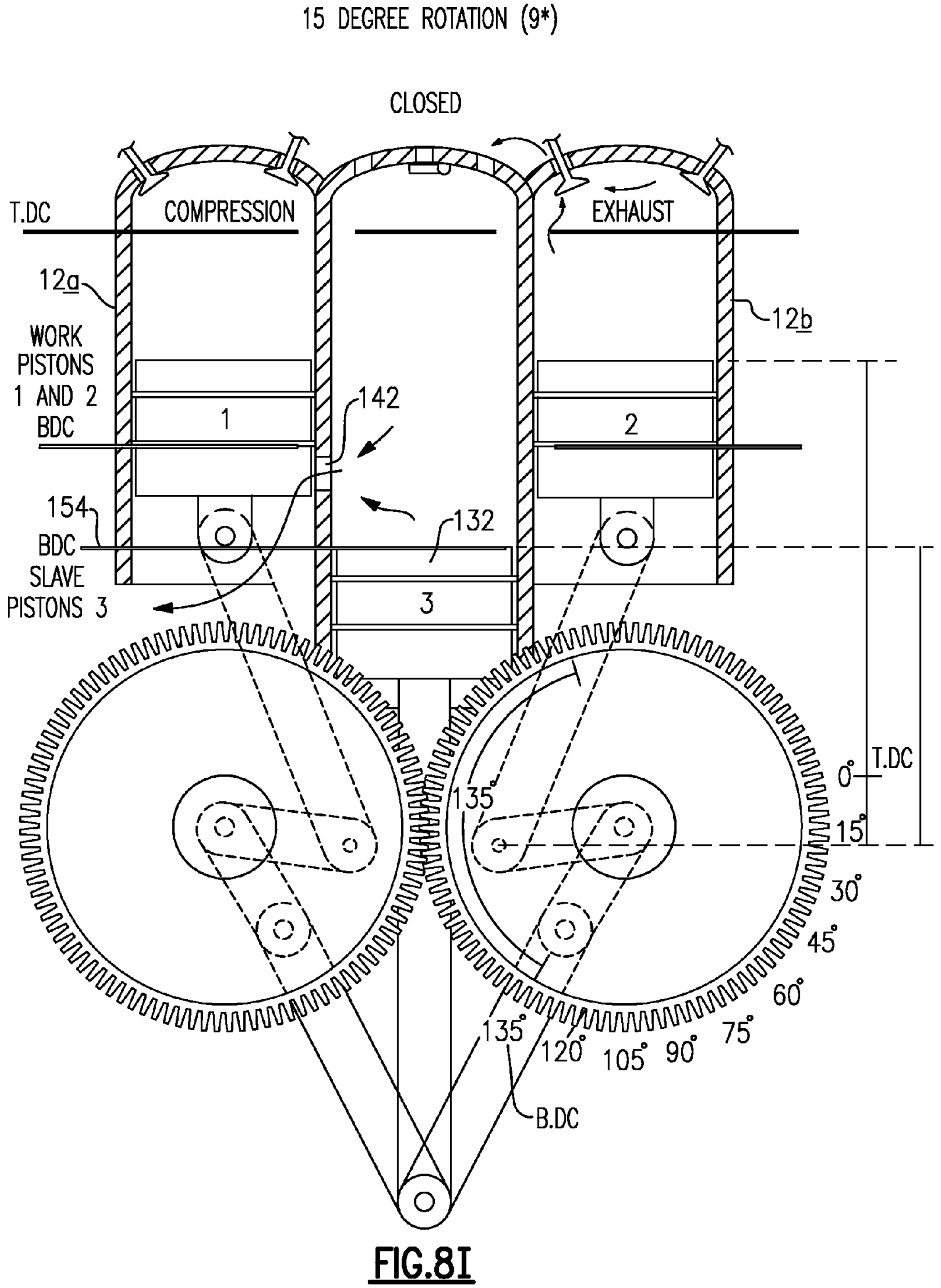
Figure 8J:
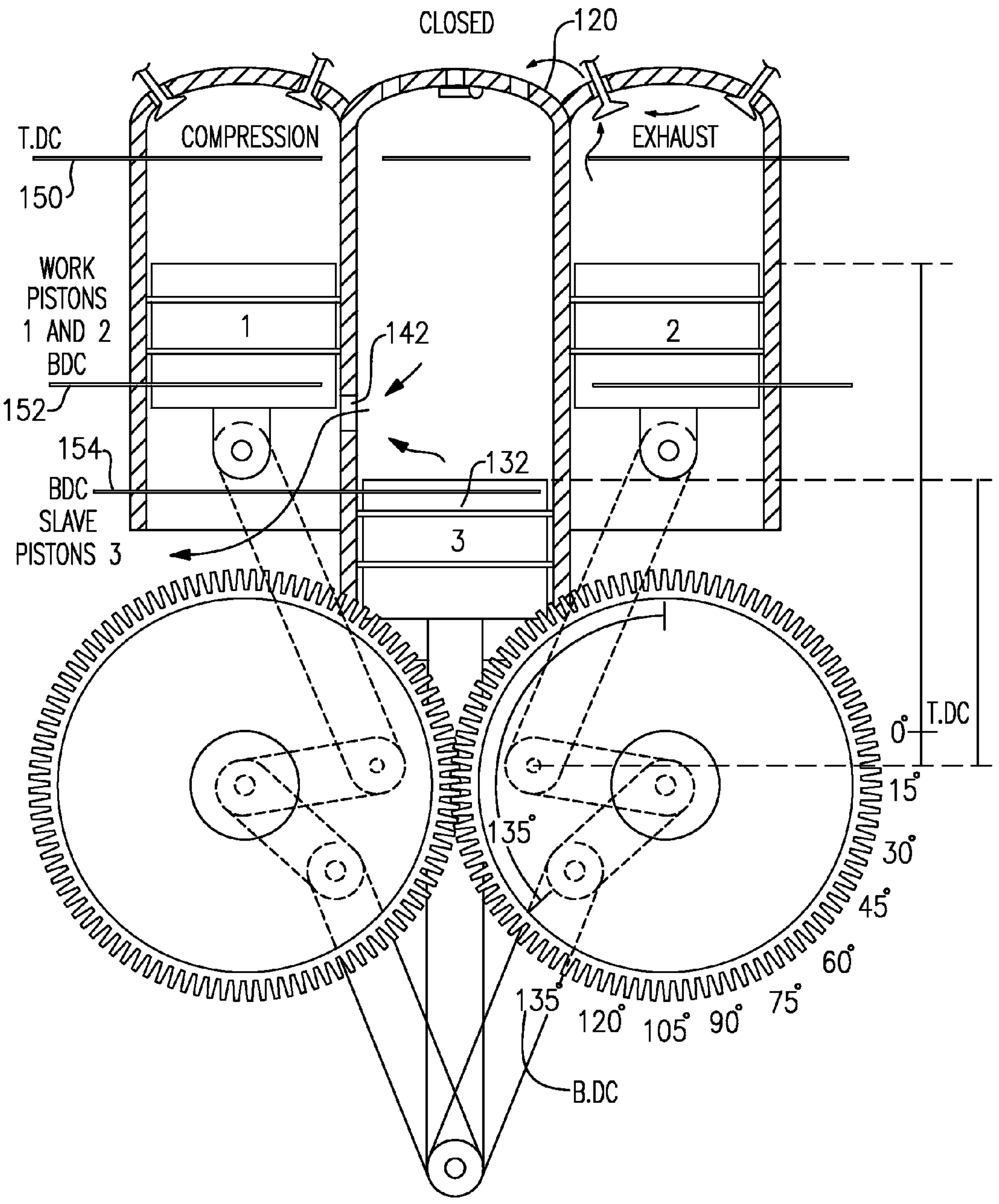
Figure 8K:
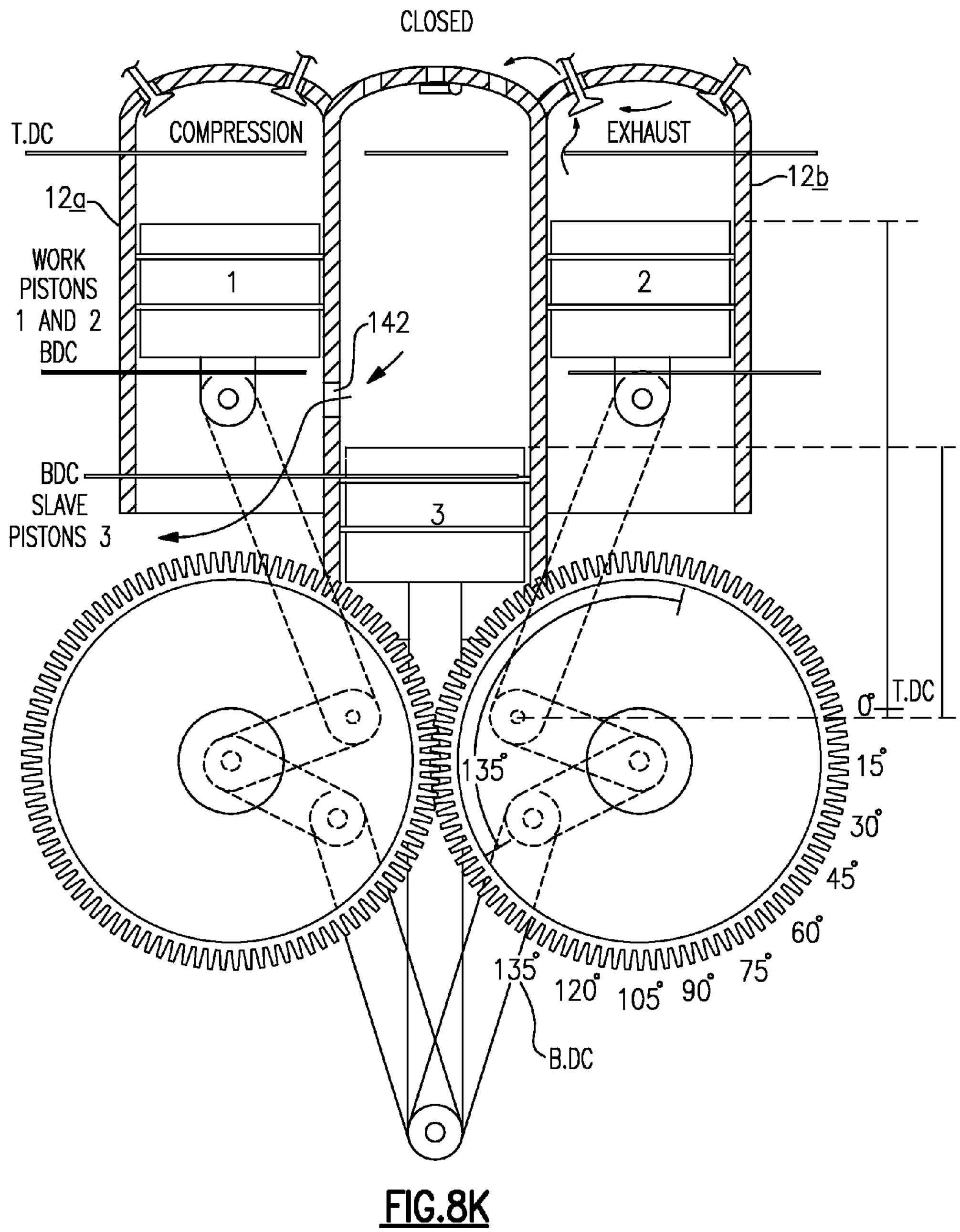
Figure 8L:
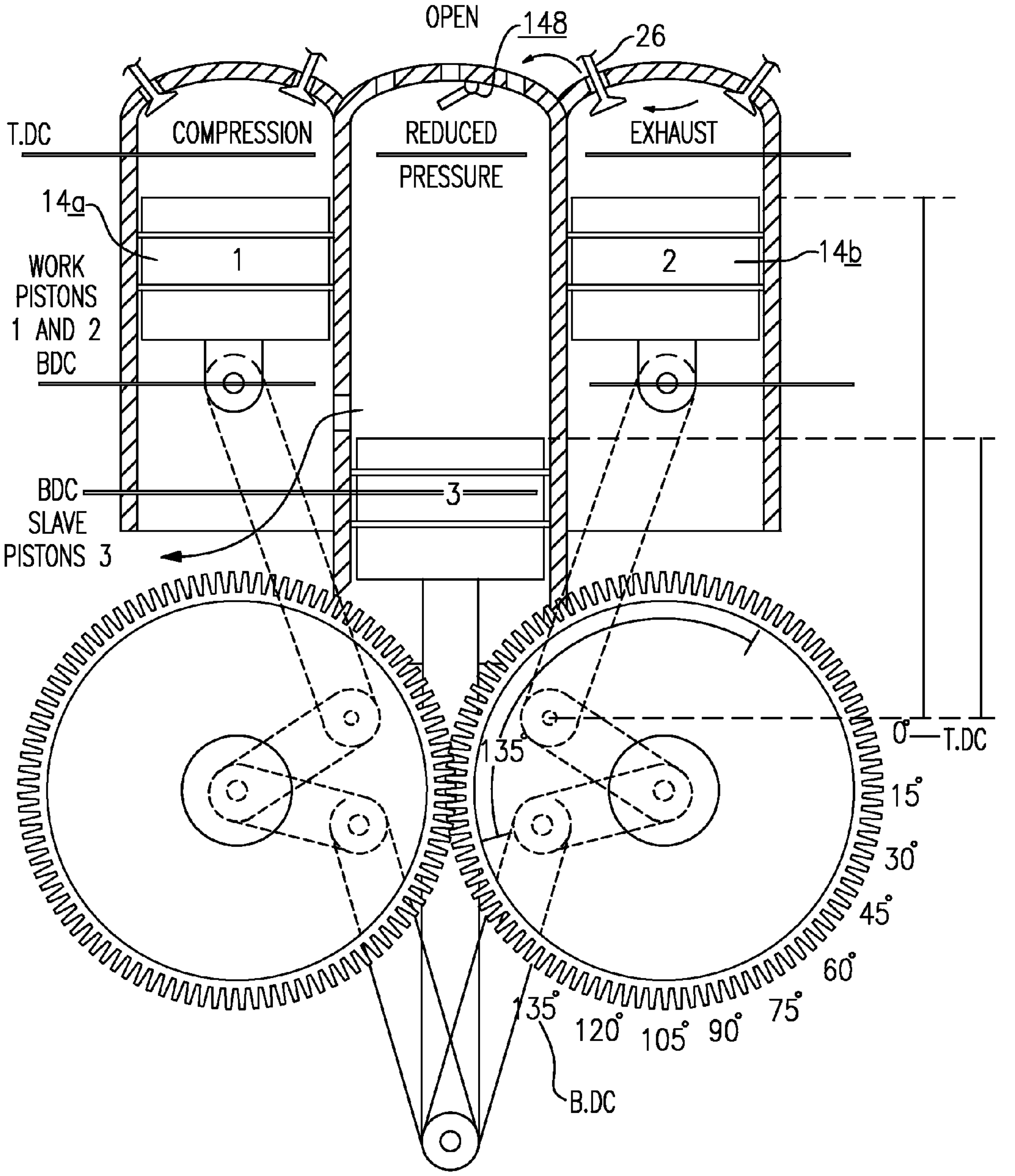
Figure 8M:
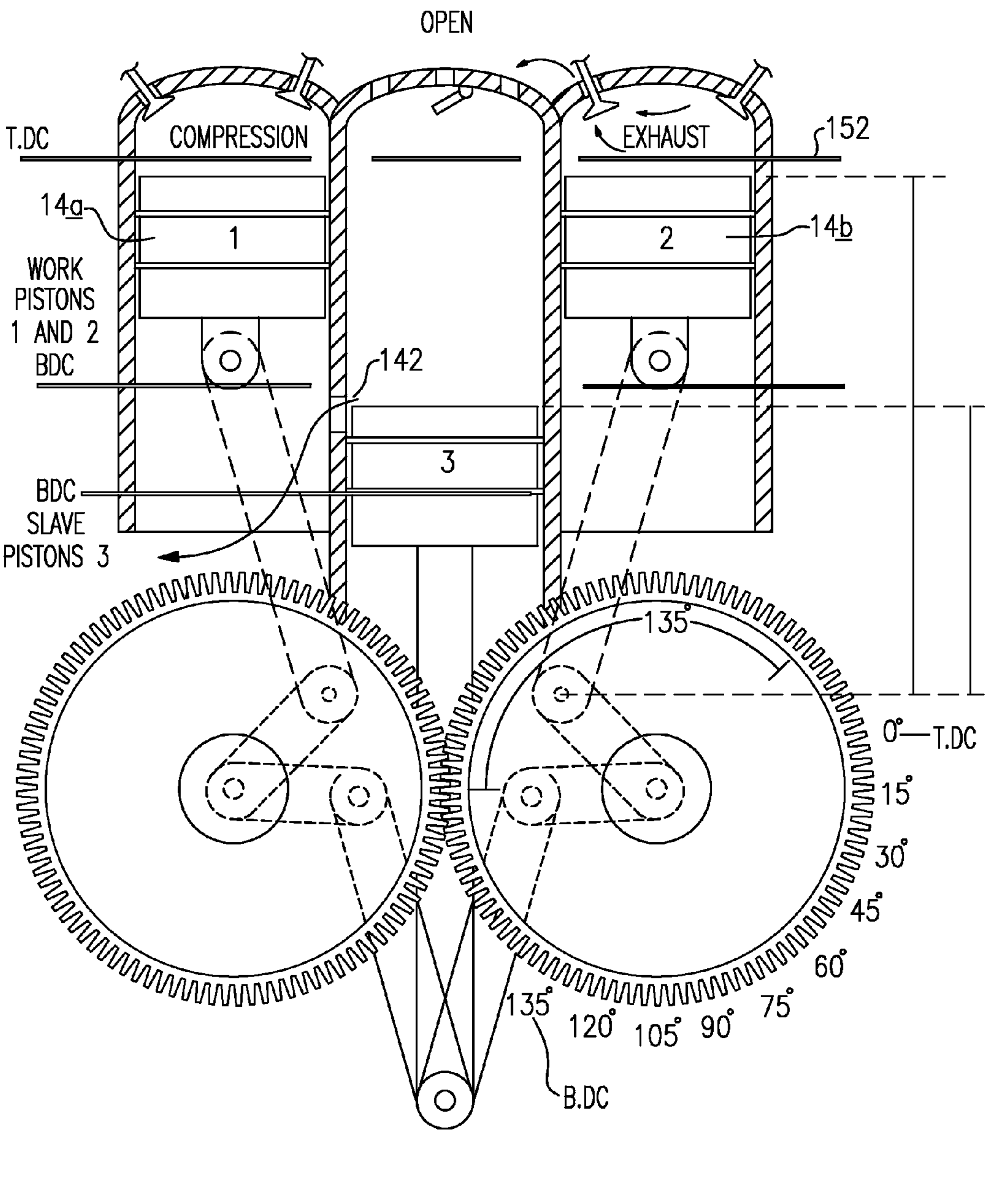
Figure 8N:
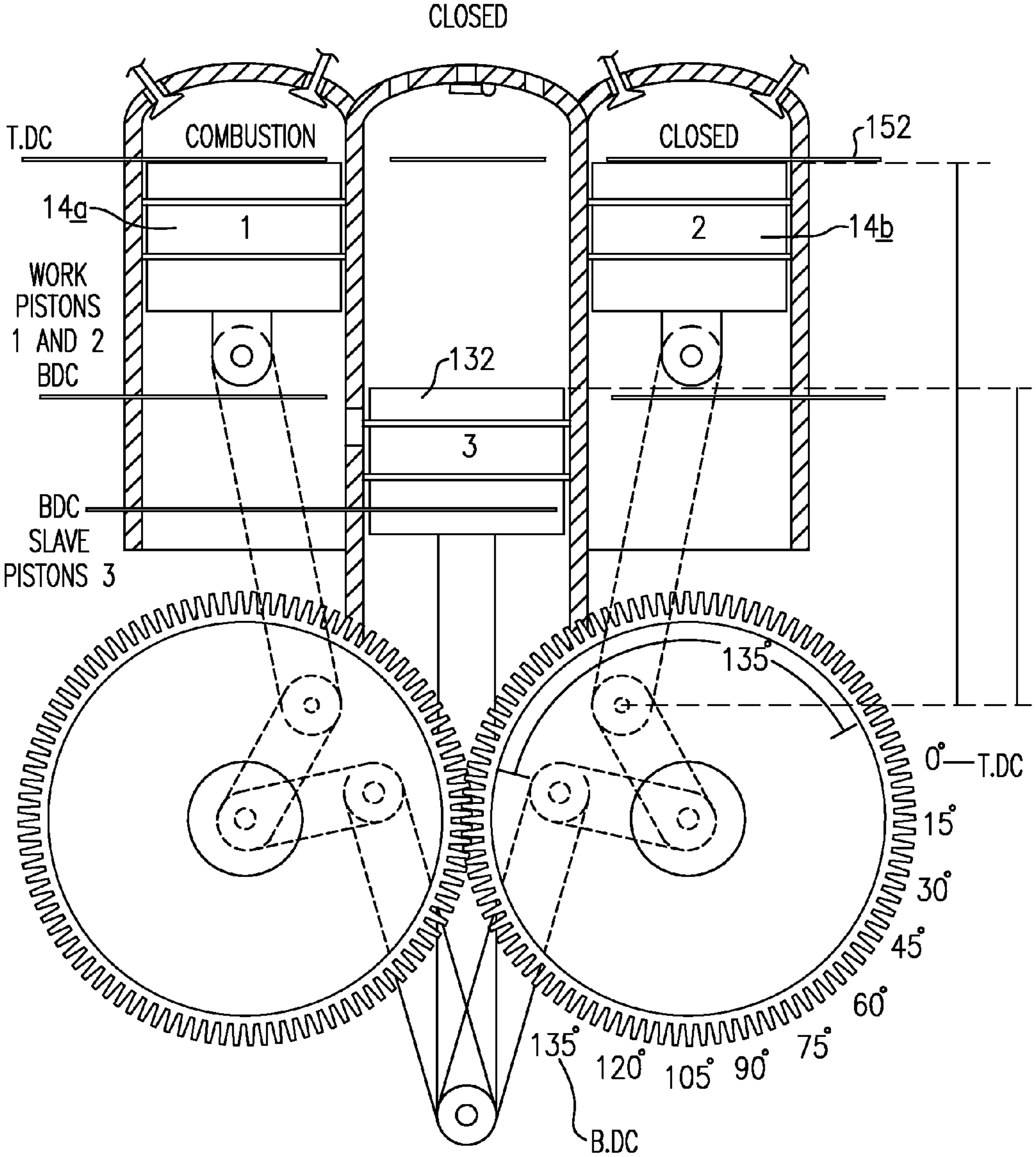
Figure 8P:
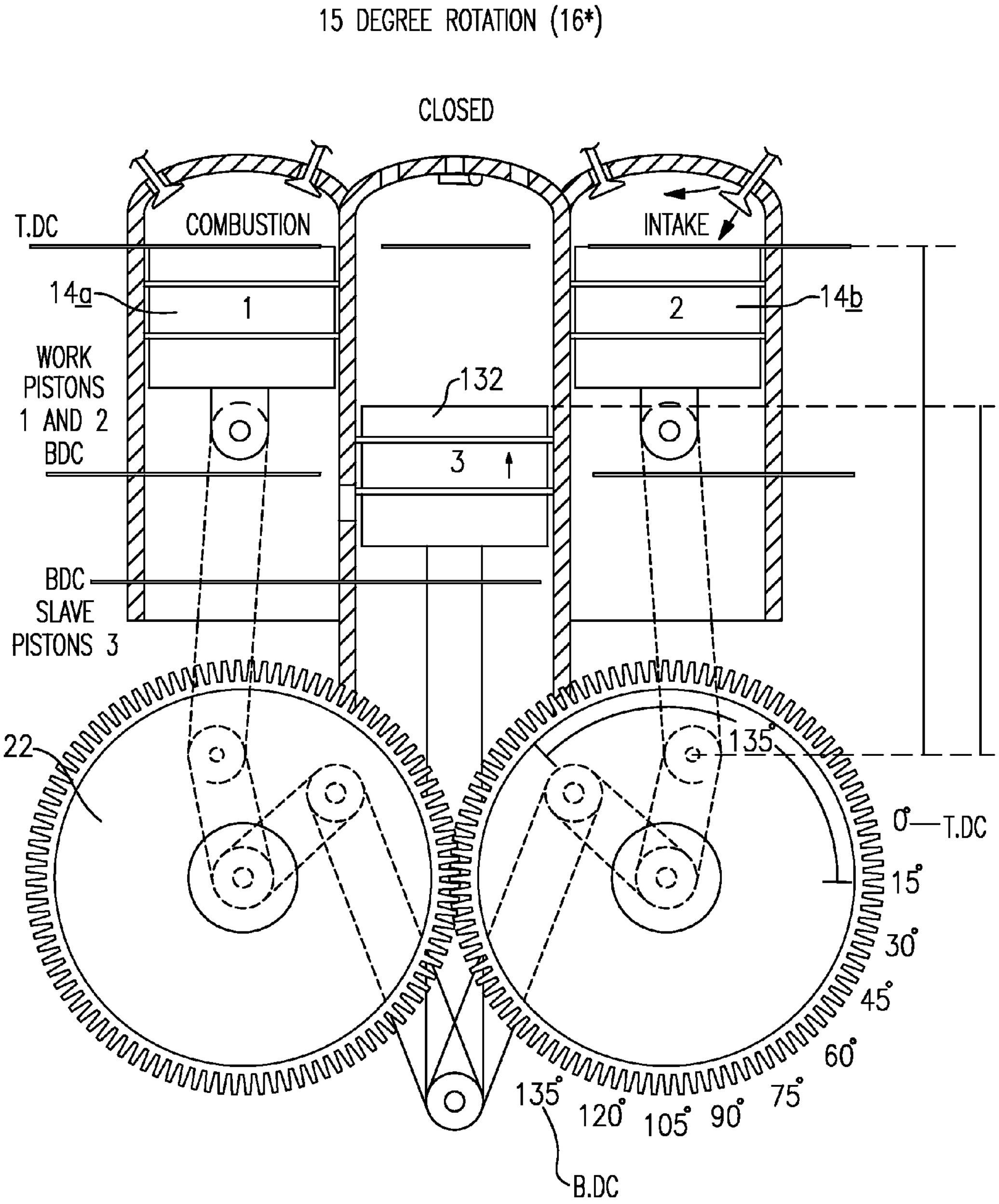
Figure 8Q:
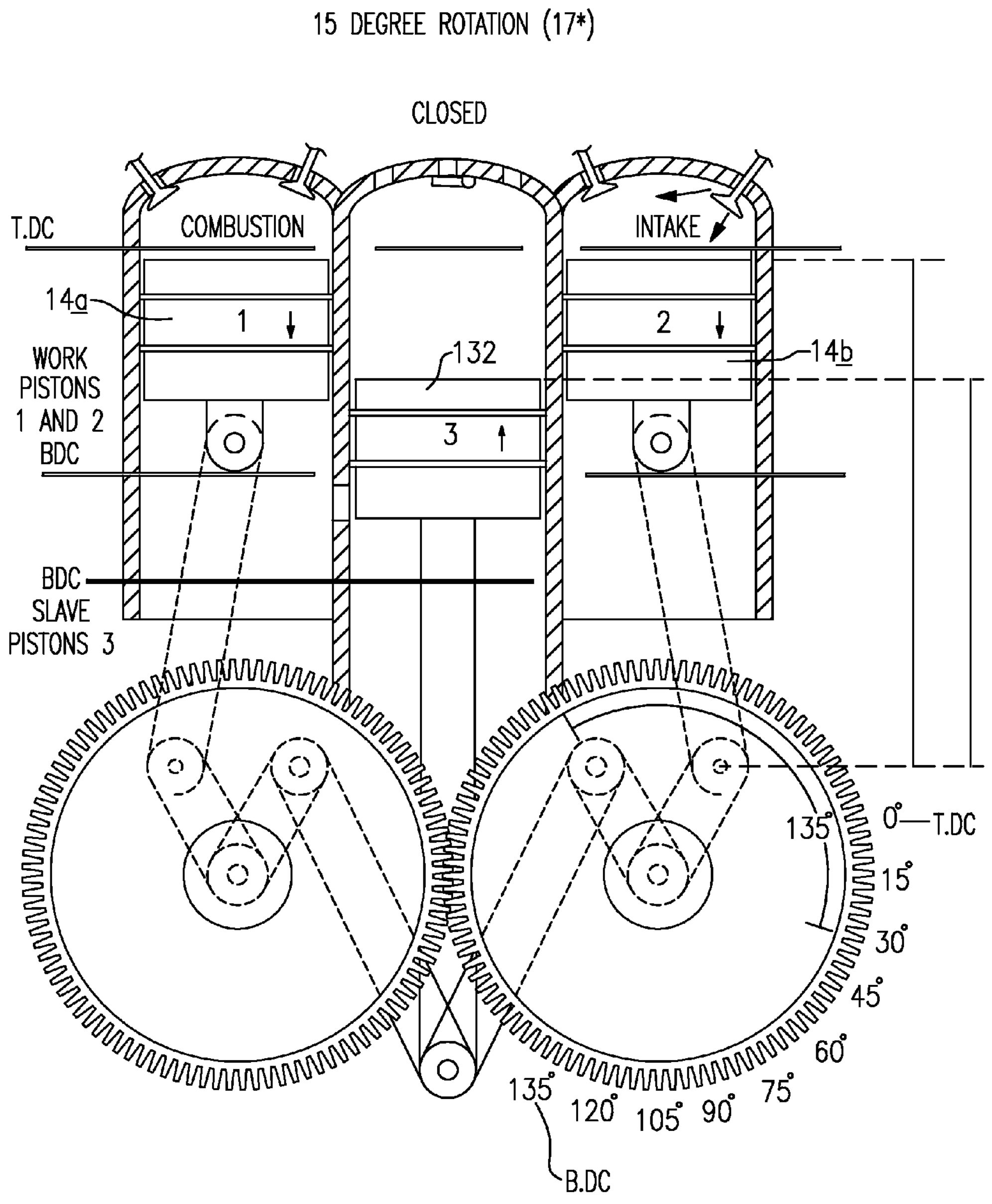
Figure 8R:
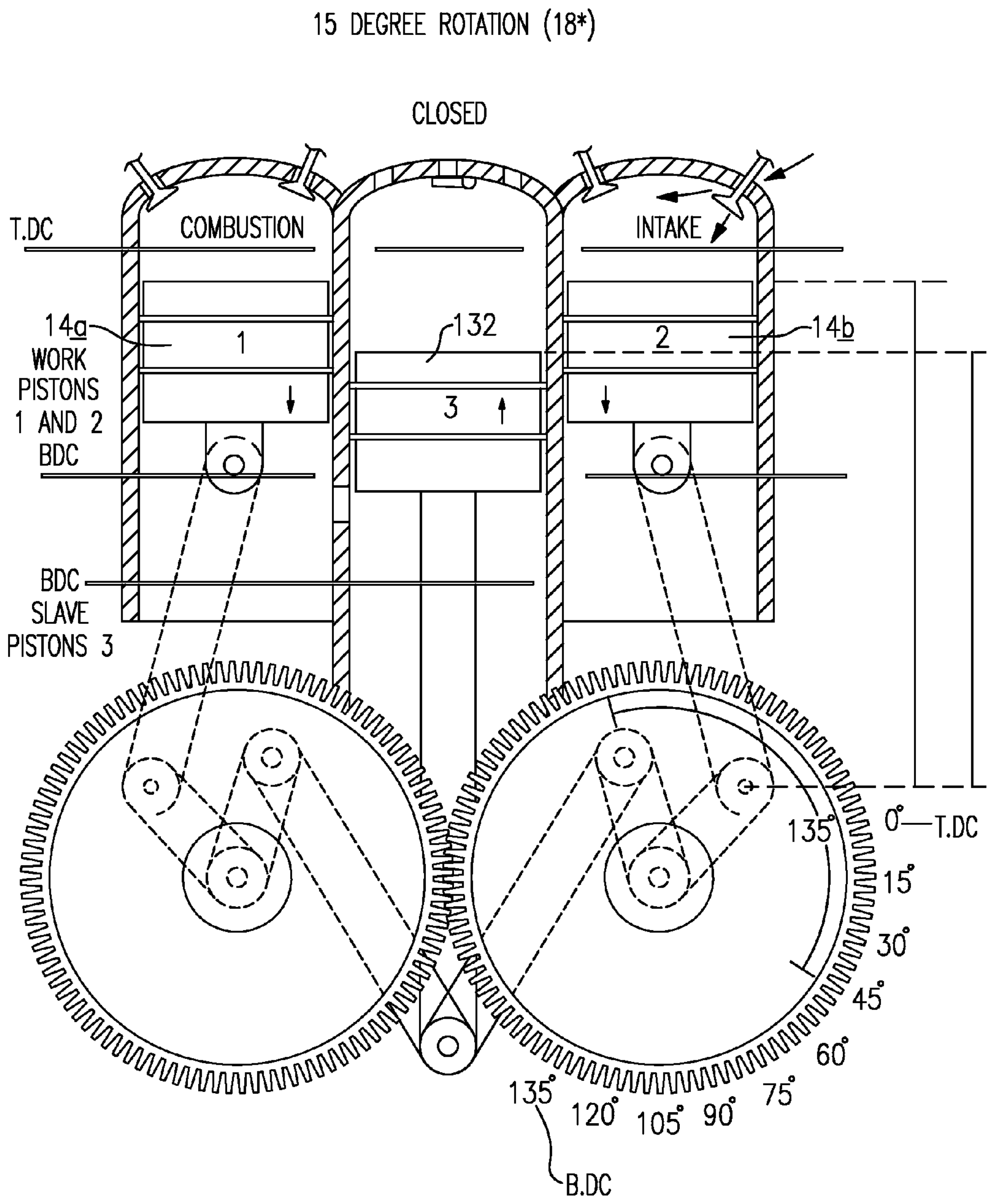
Figure 8S:
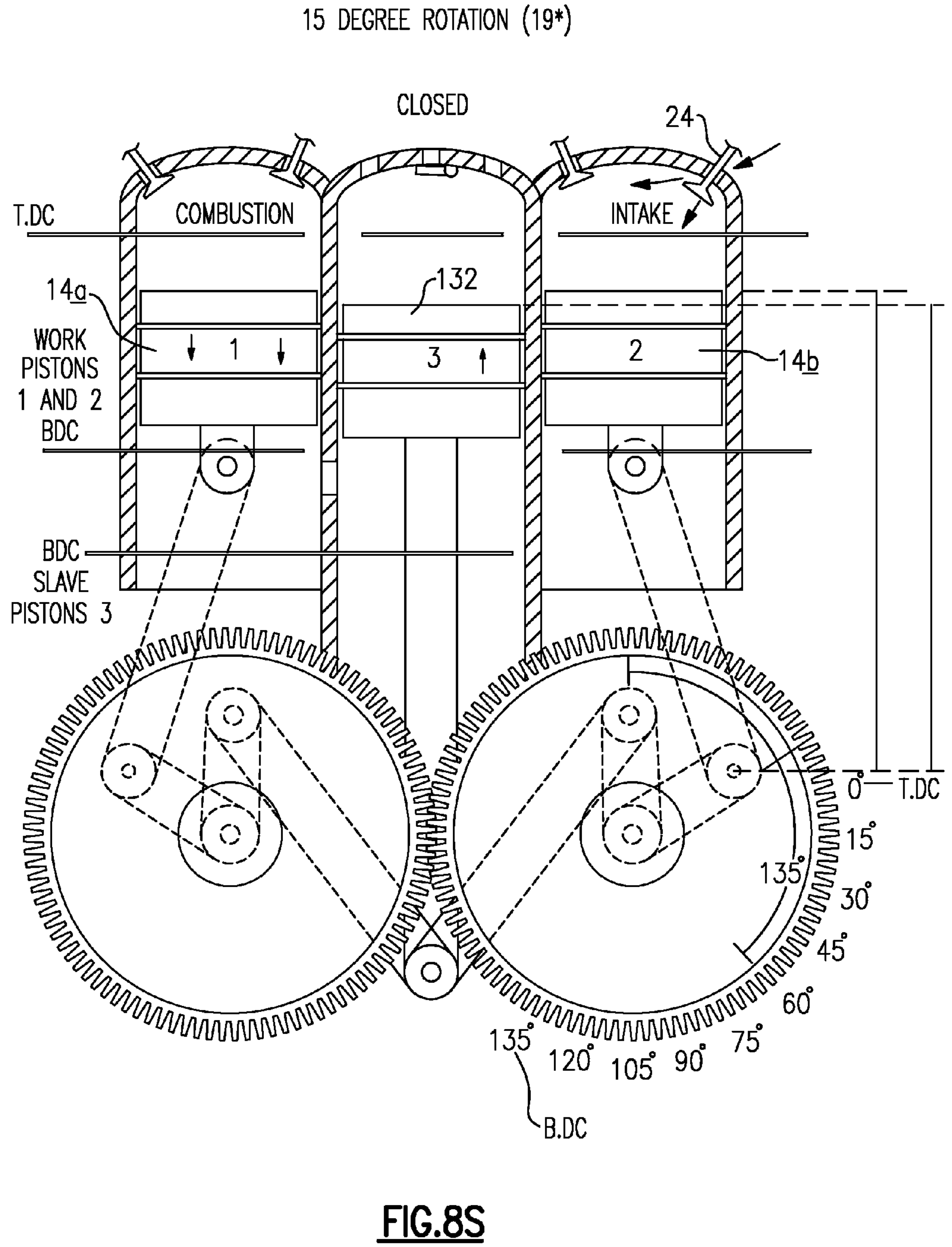
Figure 8T:
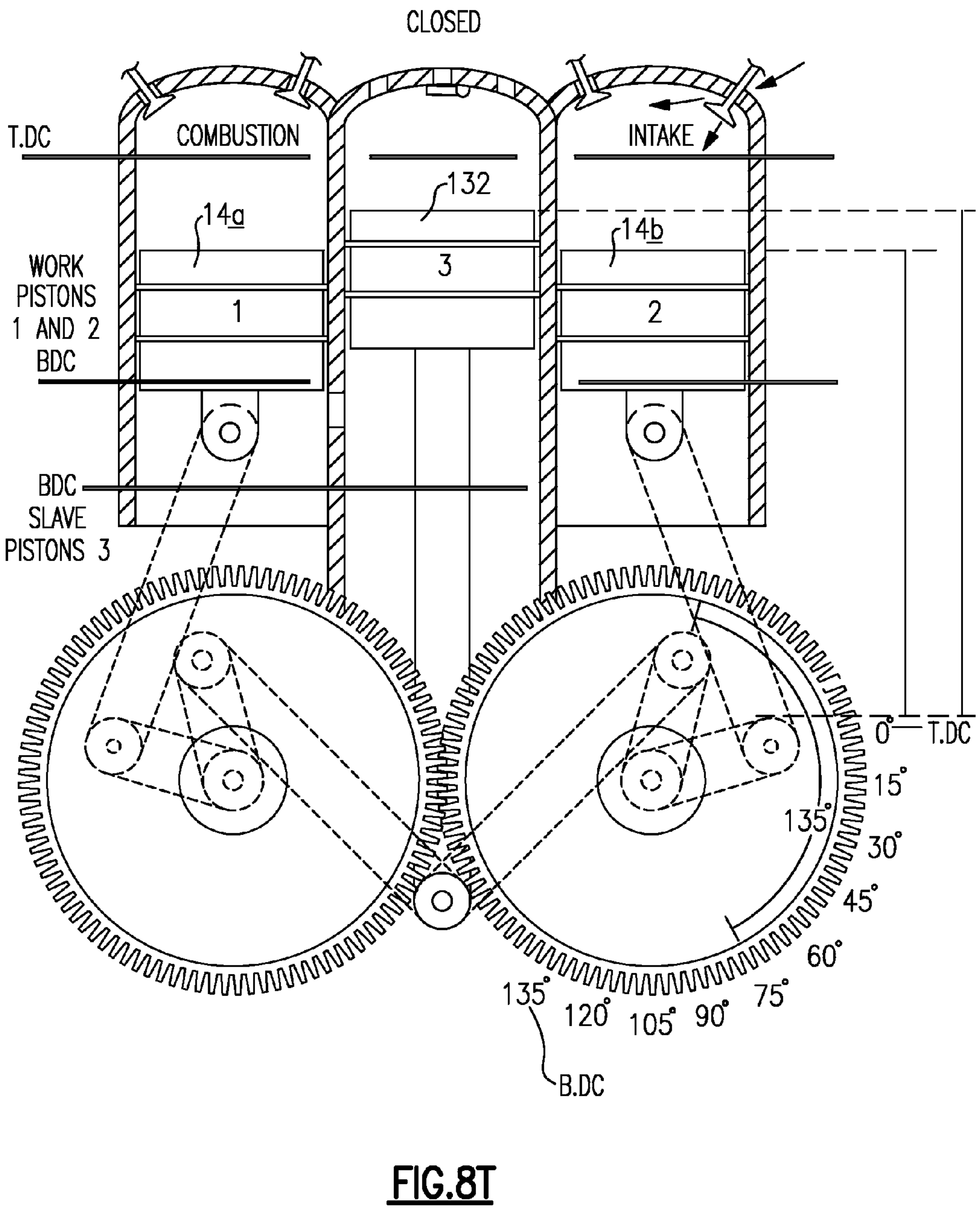
Figure 8U:
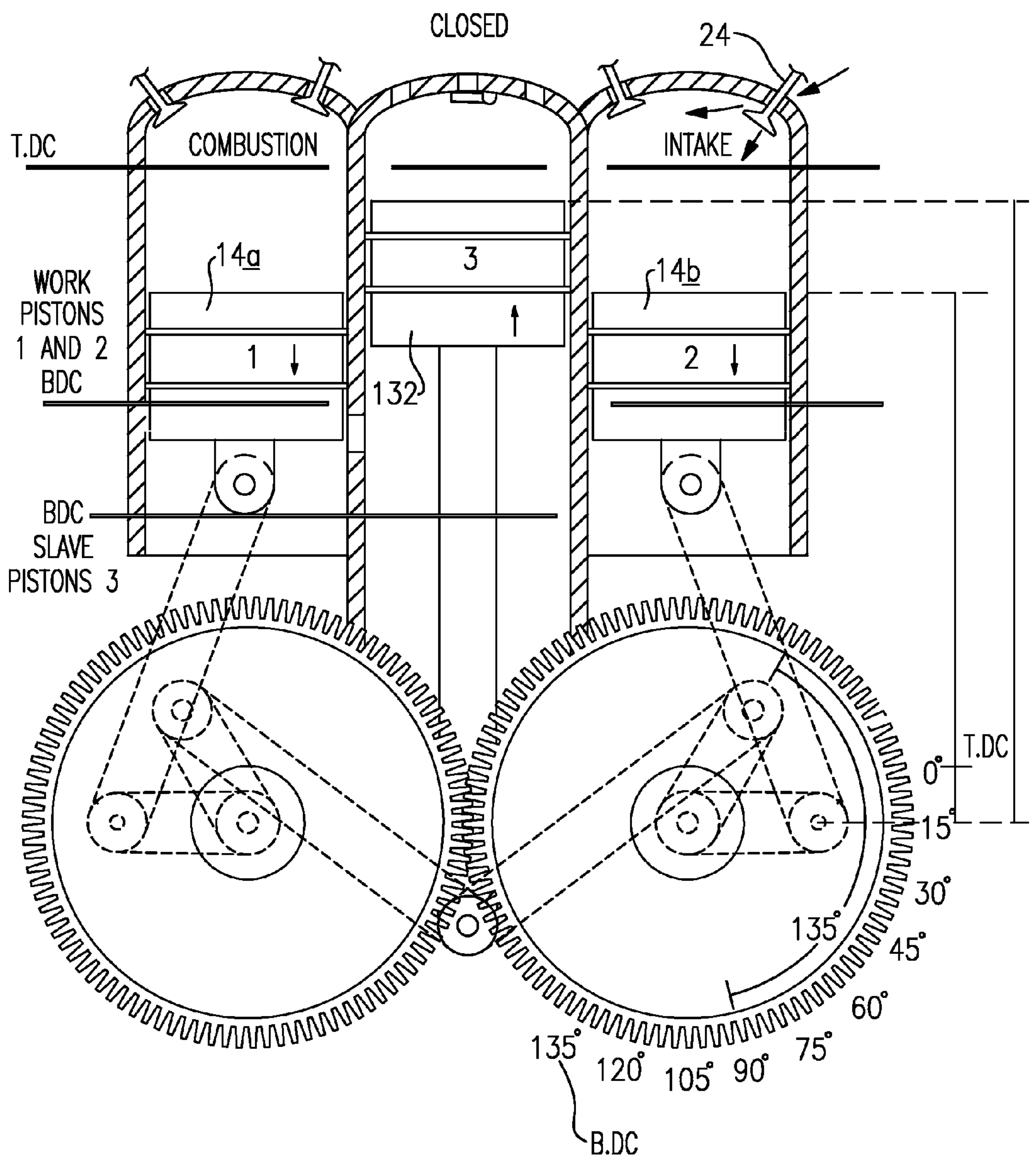
Figure 8V:
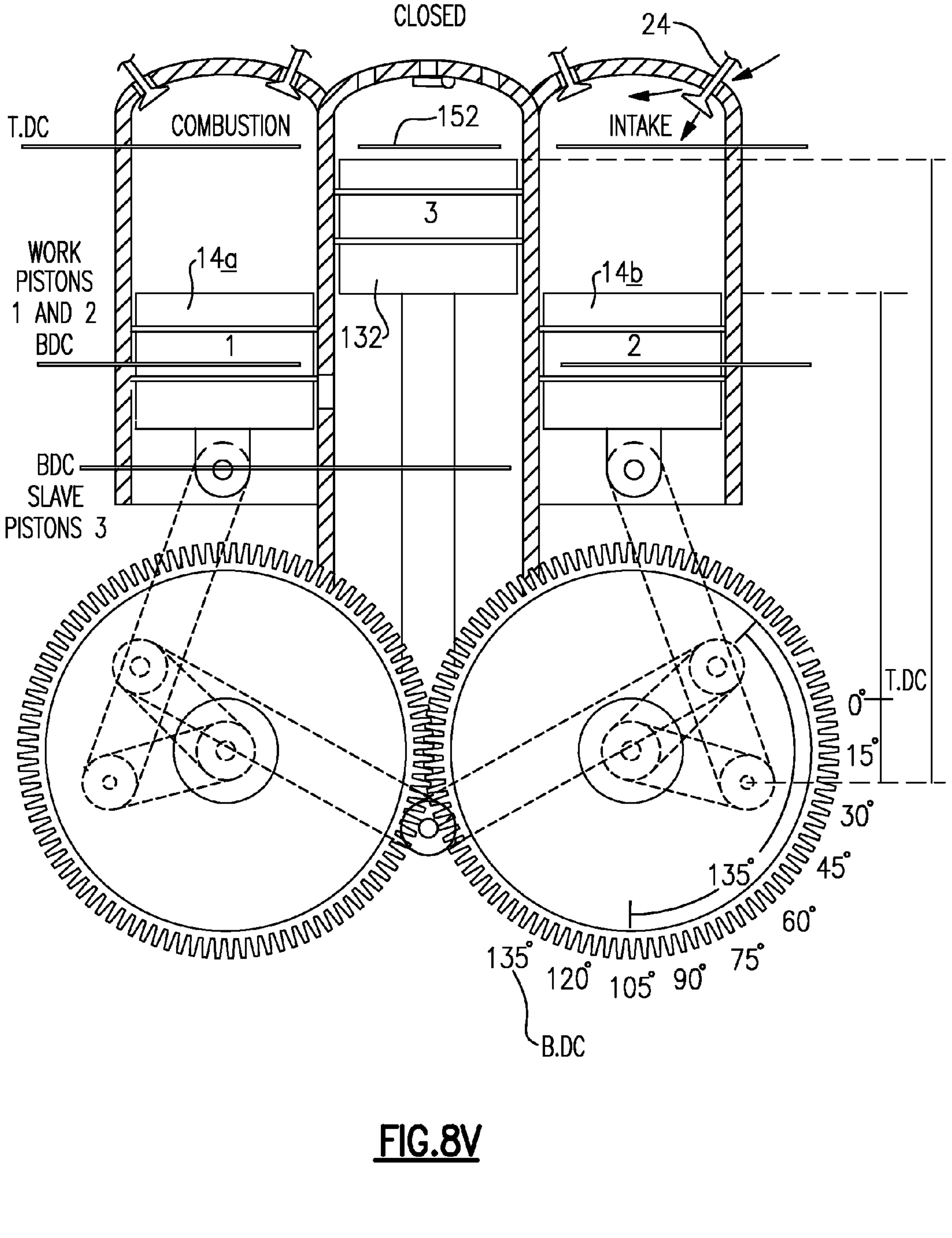
Figure 8W:
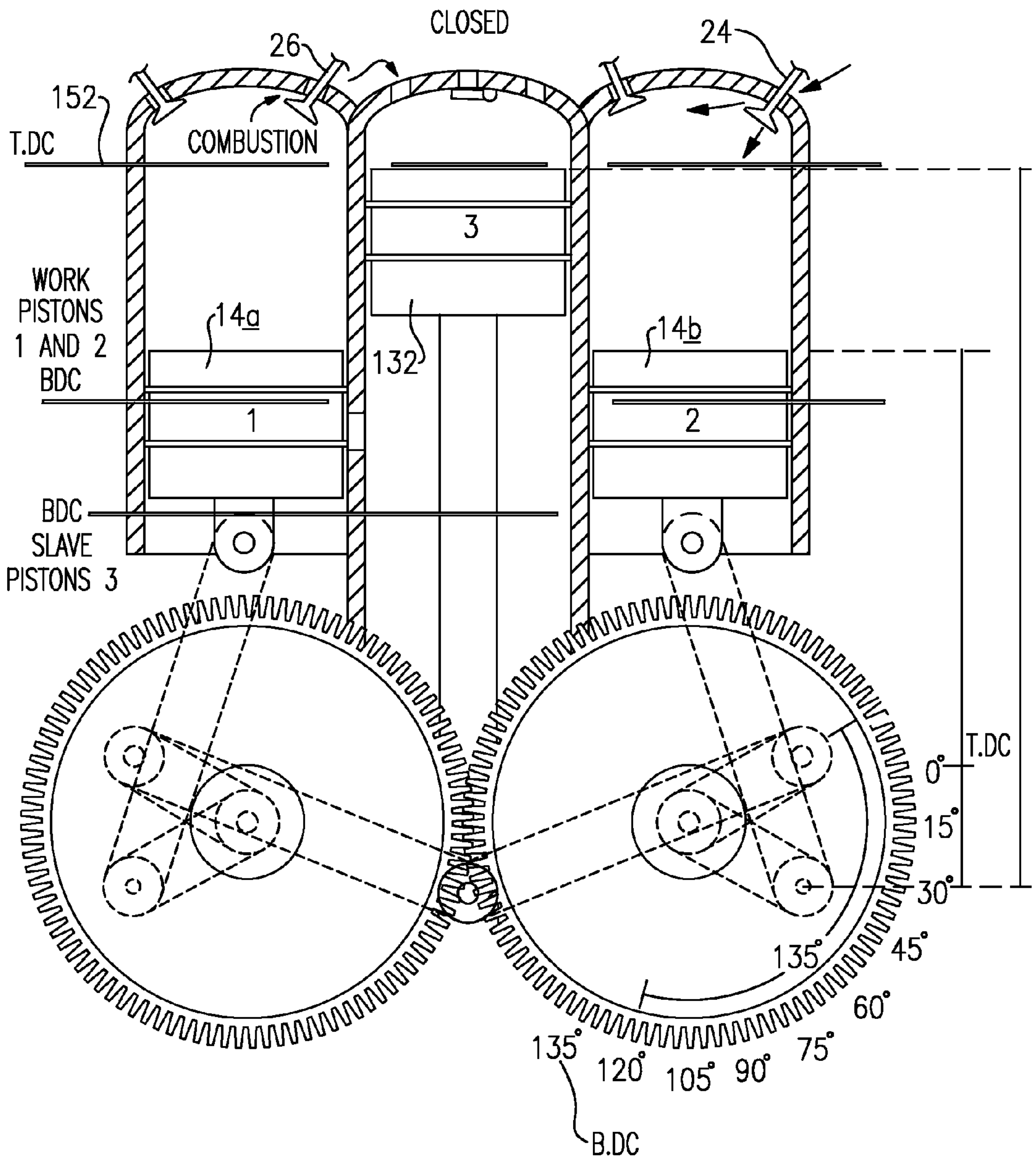
Figure 8X:
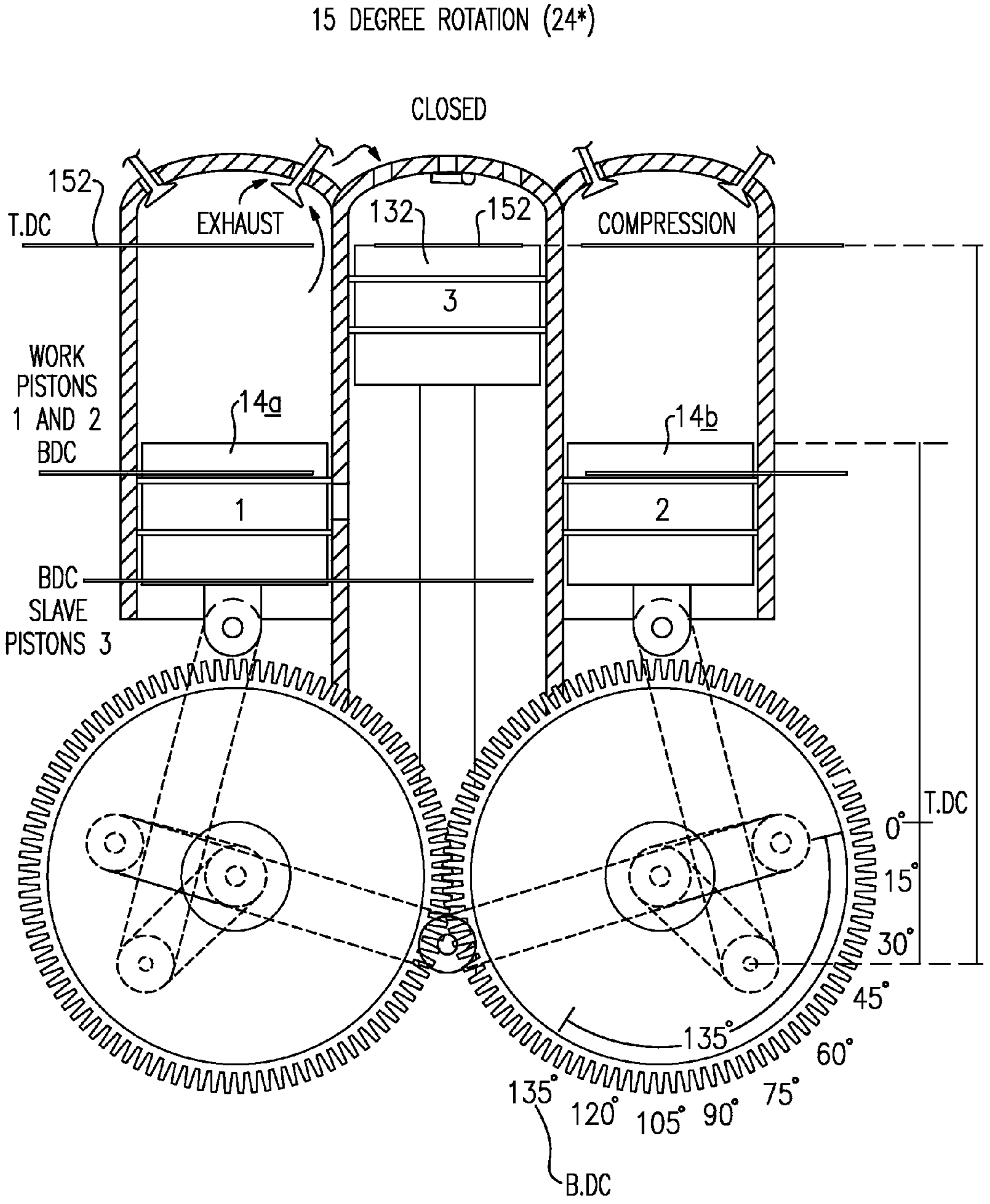

Another embodiment that operates according to the same general principles is shown in FIGS. 5 to 7, with its operation explained with respect to FIGS. 8A to 8X. The first and second main pistons are also marked "1" and "2" respectively, and the auxiliary piston is also marked "3" in these views.

In this embodiment, shown in plan in FIG. 5 and in elevation in FIG. 6, there is a pair of main cylinders 12*a* and 12*b* with pistons 14*a* and 14*b* which reciprocate as described earlier, and which drive a main crank shaft 18. The main crank shaft turns a gear 22 which meshes with a counter-rotating gear 28 that turns the second shaft 29, as discussed before, and which actuate the reciprocating drive mechanism 30, as discussed above and as explained in detail in U.S. Pat. No. 4,898,041. In this embodiment, an auxiliary cylinder 120 is employed, which has a fresh air intake 146 to admit fresh air into the cylinder chamber, as will be explained later, and which has an exhaust port 142 that is opened when the auxiliary piston passes beneath it near BDC, in a manner similar to the exhaust port operation of a two-cycle engine. The exhaust port 142 leads to an exhaust duct 144. Exhaust ducts 38 lead from the exhaust valves 26 if the main cylinders 12*a*, 12*b* to the auxiliary cylinder 120, in a fashion similar that of the above-described embodiment. Reed valves (not shown here) govern flow through these exhaust ducts 38.

As illustrated in broken line, an equivalent configuration can be achieved by constructing the engine with one of the main cylinders (here first cylinder 12*a*) to actuate the second crank shaft 29. The re-positioned cylinder is shown here as cylinder 12*a*'. FIG. 6 is thus taken in the direction of the axes of the shafts 18 and 29, with the first cylinder thus re-positioned, for simplicity of explanation with respect to the following Drawing figures. As shown in FIG. 6, there is a fresh-air intake reed valve 148 positioned at the fresh air intake 146 to admit fresh air when there is a negative relative pressure within the auxiliary cylinder 120. FIG. 7 is similar to FIG. 6, but additionally illustrates a position line 150 for bottom dead center or BDC for the two main or working pistons 14*a* and 14*b*, and position line 152 showing the positions at top dead center or TDC. The position of bottom dead center or BDC for the auxiliary piston 132 is shown as line 154. In this embodiment, the TDC position for the piston 132 is at line 152, the same TDC position as with the main pistons 14*a* and 14*b*.

FIGS. 8A to 8X show the positions of the main work pistons 14*a* and 14*b* and of the auxiliary (slave) piston 132 at successive fifteen-degree intervals of crank rotation through one full cycle of three-hundred-sixty degrees. The relations of the pistons to the TDC line 152 and to the respective BDC lines 150 and 154 change from one rotational increment to the next, as does the status of the main cylinder exhaust and intake valves, the fresh air intake reed valve 148 and the exhaust port 142 (which is controlled by the position of the auxiliary piston 132). The initial stage (and final stage) in a complete cycle is represented at FIG. 8X, in which the auxiliary piston 132 is at TDC, i.e., at line 152. FIG. 8A shows the engine at fifteen degrees of rotation of the crank shaft(s) and of the gears 22 and 28. In this example a complete descent of the auxiliary piston from TDC (at line 152) to BDC (at line 154) takes place in 135° of rotation of the gears 22, 28, and this is indicated in the markings on the gear 28. The auxiliary piston reaching BDC is shown in FIG. 8I (135°=9 increments of 15°). The return, or upstroke of the auxiliary piston from BDC back up to TDC occupies the remaining 225° of rotation. Initially, as shown in FIG. 8A, the main pistons are on their upstrokes, and one of them, here piston 14*b*, is pushing exhaust gases from the cylinder 12*b* out the open exhaust valve 28 and into the chamber of the auxiliary cylinder 120. The compression in this chamber keeps the reed valve 148 closed. As exhaust gases continue to leave the main cylinder 14*b* and pass to the auxiliary cylinder 120, the piston 132 is driven downward, extracting mechanical energy from the expanding gases. This is illustrated sequentially in FIGS. 8B, 8C, 8D, 8E, 8F, 8G and 8H, with the auxiliary piston 132 reaching BDC as shown in FIG. 8I. At about 45° of rotation, as shown in FIG. 8C, the main working pistons 14*a* and 14*b* have reached BDC at line 150, and will begin their return or upstroke. As shown in FIGS. 8E to 8M, when the auxiliary piston is near BDC the piston 132 passes below the location of the exhaust port 142 in the side wall of the cylinder 120. This allows the expanded exhaust gas to leave the cylinder 120 and pass to the exhaust conduit 144, from which it is eventually discharged. The exhaust gases leave in the manner that occurs with a typical two-stroke engine. In these views, the conduit

144 is omitted for clarity. In a practical embodiment, the exhaust conduit 144 is not in the same plane as the cylinder 12*a* and piston 14*a*.

Figure 80:
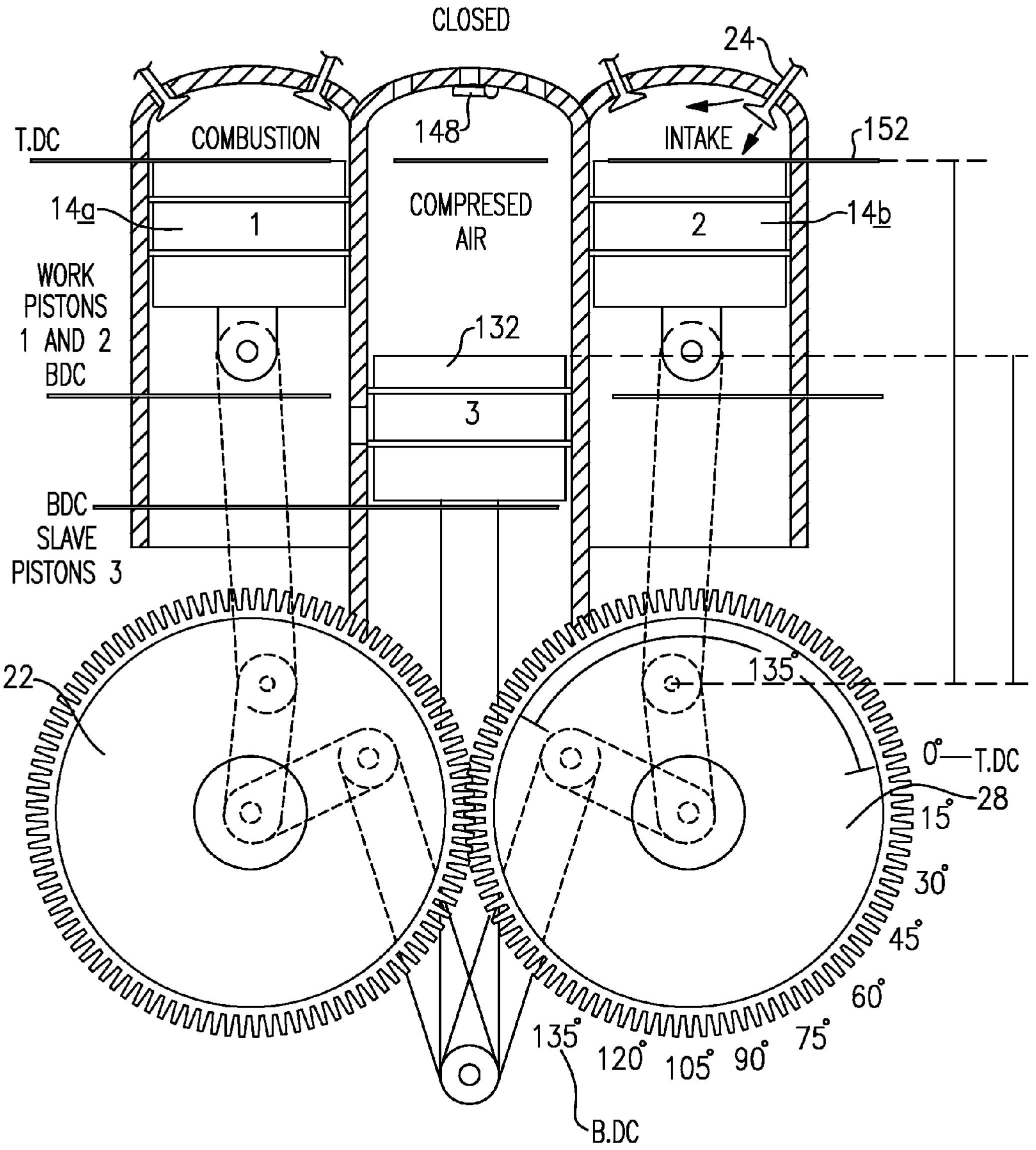

After 135° of rotation, as shown beginning with FIG. 8J, all three pistons are moving upwards, towards TDC. At about 180° , as shown in FIG. 8L, when the exhaust valve 26 begins to close in cylinder 12*b*, there is a reduced pressure within the cylinder 120 above the piston 132, and air begins to flow in past the reed valve 148. Some of the pressure reduction is from scavenging effect of the leaving gases as they exit via the exhaust port 142. The reed valve remains open for a brief period (See FIG. 8M), and then closes as the piston 132 rises above the exhaust port 142 (FIG. 8N). Then at 225° of rotation, as shown in FIG. 80, the main working pistons 14*a* and 14*b* reach TDC. At this point the intake valve 24 opens in one of the two cylinders, here cylinder 12*b*, to commence the intake phase. In the companion cylinder 12*a* combustion commences a power phase. In the following stages, i.e., FIGS. 8P, 8Q, 8R, 8S, 8T, 8U, 8V and 8W, the piston 132 compresses the charge of fresh air in the cylinder 120, which then mixes with the hot gases that are discharged later from the main working cylinders. This compressed fresh air will help oxidize any uncombusted fuel gases or complete oxidation of any carbon monoxide in the exhaust gases. This provides still additional energy that can be extracted in the auxiliary cylinder 120.

The main improvements of this invention derive from employment of an asymmetric cycle auxiliary piston and cylinder at the discharge or exhaust side of a heat engine. The invention may be applied with internal combustion engines or with external combustion type heat engines and is not limited to the type of engines shown here. Also, there can be an auxiliary cylinder employed with a single-cylinder engine, or each auxiliary cylinder coupled with a group of more than two main cylinders.

Many modifications and variations of this invention would become apparent to persons skilled in this art without departing from the scope and spirit of the invention, as defined in the appended claims.

I claim:

1. A compound internal combustion engine comprising:

two main pistons paired to reciprocate up and down together within two main engine cylinders and coupled to a main rotating crank rotating continuously in a first direction, the main pistons having at least a compression phase and an exhaust phase;

an auxiliary cylinder coupled to the two main cylinders having an intake receiving exhaust gases from at least one main engine cylinder during its exhaust phase, and with an auxiliary exhaust valve that opens when at least one main cylinder is in its compression phase;

an auxiliary piston in said auxiliary cylinder and adapted to reciprocate within said auxiliary cylinder; and an auxiliary crank coupled to counter-rotate with respect to the main rotating crank, and rotating continuously in a second direction opposite to said first direction, and linkage means coupling said auxiliary piston with both said main and auxiliary crank such that when the downward stroke of the auxiliary corresponds to a crank angle exceeding 180 degrees for said main crank, and the upward stroke of the auxiliary piston corresponds to a crank angle below 180 degrees for said main crank, such that the auxiliary piston enjoys an asymmetric phase characteristic using a greater amount of main crank angle rotation for its downward stroke thus increasing the amount of power extracted from the exhaust gases from the two main cylinders.

2. The compound internal combustion engine of claim 1, wherein each of said main cylinders has an exhaust conduit leading to said auxiliary cylinder.

3. The compound internal combustion engine of claim 2, wherein each of said main cylinders has an exhaust valve opening the associated main cylinder to the respective exhaust conduit during an exhaust phase thereof.

4. The compound internal combustion engine of claim 2, in which said auxiliary cylinder has an exhaust port in a side wall thereof and positioned between top dead center and bottom dead center positions of the auxiliary piston, and which is open for a predetermined dwell near bottom dead center of said auxiliary piston.

5. The compound internal combustion engine of claim 4, further comprising a valve in said auxiliary cylinder admitting fresh air into said auxiliary cylinder at a given phase of said auxiliary piston.

6. The compound internal combustion engine of claim 1 wherein the downward stroke of the auxiliary piston corresponds to a crank angle of said main crank of substantially 230 degrees and the upward stroke thereof corresponds to a crank angle of said main crank of substantially 130 degrees.

7. A compound internal combustion engine comprising:

two main pistons paired to reciprocate up and down together within two main engine cylinders and coupled to a main rotating crank which rotates continuously in a first direction, the main cylinders having at least a compression phase and an exhaust phase;

an auxiliary cylinder coupled to the two main cylinders having an intake receiving exhaust gases from at least one main engine cylinder during its exhaust phase, and with an auxiliary exhaust valve that opens when at least one main cylinder is in its compression phase;

an auxiliary piston adapted to reciprocate within said auxiliary cylinder; and an auxiliary crank coupled to counter-rotate with respect to the main rotating crank, and to rotate continuously in a second direction opposite to said first direction, and linkage means coupling said auxiliary piston with both said main and auxiliary crank such that when the downward stroke of the auxiliary corresponds to a crank angle below 180 degrees for said main crank, and the upward stroke of the auxiliary piston corresponds to a crank angle exceeding 180 degrees for said main crank, such that the auxiliary piston enjoys an asymmetric phase characteristic using a greater amount of main crank angle rotation for its upward stroke thus increasing the amount of power extracted from the exhaust gases from the two main cylinders.

8. The compound internal combustion engine of claim 7, wherein each of said main cylinders has an exhaust conduit leading to said auxiliary cylinder.

9. The compound internal combustion engine of claim 8, wherein each of said main cylinders has an exhaust valve opening the associated main cylinder to the respective exhaust conduit during an exhaust phase thereof.

10. The compound internal combustion engine of claim 8, in which said auxiliary cylinder has an exhaust port in a side wall thereof positioned between top dead center and bottom dead center positions of the auxiliary piston, and which is open for a predetermined dwell near bottom dead center of said auxiliary piston.

11. The compound internal combustion engine of claim 10, further comprising a valve admitting fresh air into said auxiliary cylinder at a given phase of said auxiliary piston.

12. The compound internal combustion engine of claim 7 wherein the upward stroke of the auxiliary piston corresponds to a crank angle of said main crank of substantially 225 degrees and the downward stroke thereof corresponds to a crank angle of said main crank of substantially 135 degrees.

* * * * *

UNITED STATES PATENT AND TRADEMARK OFFICE

CERTIFICATE OF CORRECTION

PATENT NO. : 8,381,692 B2
APPLICATION NO. : 13/013944
DATED : February 26, 2013
INVENTOR(S) : John J. Islas It is certified that error appears in the above-identified patent and that said Letters Patent is hereby corrected as shown below:

In the Specifications:

Col. 6, line 14: "80" should read --8O--

Signed and Sealed this
Seventh Day of May, 2013

Teresa Stanek Rea
*Acting Director of the United States Patent and Trademark Office*